United States Patent [19]
Selle et al.

[11] Patent Number: 5,857,953
[45] Date of Patent: Jan. 12, 1999

[54] DRAW TAPE MACHINES

[75] Inventors: Paul A. Selle, Appleton; Peter J. Gietman, Jr., Combined Locks; Timothy R. Dutter, Appleton; Thomas C. Jansen, Appleton; Frank M. Slama, Appleton, all of Wis.

[73] Assignee: CMD Corporation, Appleton, Wis.

[21] Appl. No.: 582,069

[22] Filed: Jan. 2, 1996

[51] Int. Cl.[6] ................................. B31B 1/90
[52] U.S. Cl. ................. 493/225; 493/191; 493/197; 493/232; 493/928
[58] Field of Search ................... 493/189–197, 493/225, 232, 235, 928

[56] References Cited

U.S. PATENT DOCUMENTS

| | | | |
|---|---|---|---|
| 3,058,403 | 10/1962 | Kugler | 493/194 |
| 3,059,690 | 10/1962 | Nyborg | 156/498 |
| 3,140,643 | 7/1964 | Barthelmess | 493/191 |
| 3,859,895 | 1/1975 | White | 493/194 |
| 4,108,712 | 8/1978 | Bala et al. | 493/190 |
| 4,198,259 | 4/1980 | Van Der Meulen | 493/190 |
| 4,419,087 | 12/1983 | Herrington | 493/439 |
| 4,597,750 | 7/1986 | Boyd et al. | 493/346 |
| 4,617,008 | 10/1986 | Boyd et al. | 493/248 |
| 4,624,654 | 11/1986 | Boyd et al. | 493/194 |
| 4,664,649 | 5/1987 | Johnson et al. | 493/197 |
| 4,714,455 | 12/1987 | Herrington | 493/225 |
| 4,717,373 | 1/1988 | Catchman et al. | 493/193 |
| 4,721,502 | 1/1988 | Herrington | 493/193 |
| 4,795,412 | 1/1989 | Herrington | 493/225 |
| 4,820,249 | 4/1989 | Wech | 493/225 |
| 4,820,251 | 4/1989 | Blaser | 493/225 |
| 4,820,252 | 4/1989 | Osborn | 493/440 |
| 4,824,425 | 4/1989 | Stock | 493/193 |
| 4,832,677 | 5/1989 | Hudgens et al. | 493/369 |
| 4,850,944 | 7/1989 | Osborn | 493/225 |
| 4,881,933 | 11/1989 | Wech | 493/225 |
| 4,895,611 | 1/1990 | Bryniarski et al. | 493/225 |
| 5,024,642 | 6/1991 | Buchman et al. | 493/193 |
| 5,057,065 | 10/1991 | Buchman | 493/194 |
| 5,083,999 | 1/1992 | Barta | 493/439 |
| 5,186,707 | 2/1993 | Barta | 493/439 |
| 5,199,246 | 4/1993 | Rodrigo | 493/100 |

FOREIGN PATENT DOCUMENTS 448423   2/1987   Sweden .

*Primary Examiner*—Michael J. Carone
*Assistant Examiner*—Darren Ark
*Attorney, Agent, or Firm*—Thomas D. Wilhelm; Jerry F. Janssen

[57] ABSTRACT

This invention pertains to draw tape equipment, and methods for incorporating draw tapes into plastic and like bags. In general, a continuous plastic web is slit at a slitting station to form layers, and respective free edges. The web then passes to a hole forming station where holes are punched in the top and bottom layers adjacent the free edges. After the holes are punched, edge regions of the top and bottom layers are separated from each other, followed by forming of hems in the separated layers at hem forming stations arranged in parallel with each other. Concurrent with forming of the hems, continuous draw tapes are fed to the hem forming stations and the hems are formed about the draw tapes. The formed hems, with the draw tapes incorporated therein, optionally pass through first temperature control stations where the temperature of the plastic web is controlled to a desired temperature before hem sealing. The formed hems are then sealed to the main bodies of the respective top and bottom layers. Narrow pressure wheels apply pressure to the hot seals to improve seal quality. The sealed hems optionally pass through second temperature control stations to cool the web. The edge regions of the layers are then rejoined, in face-to-face relationship with each other.

71 Claims, 9 Drawing Sheets

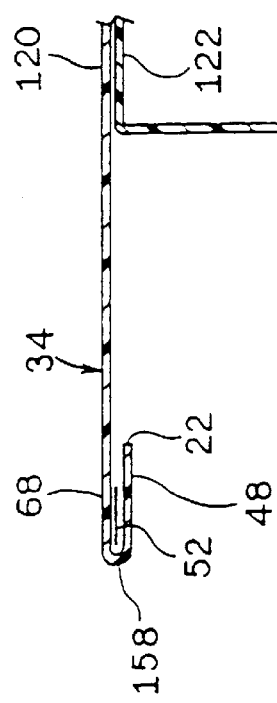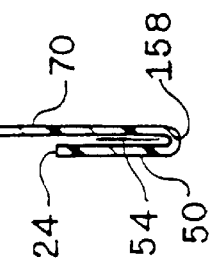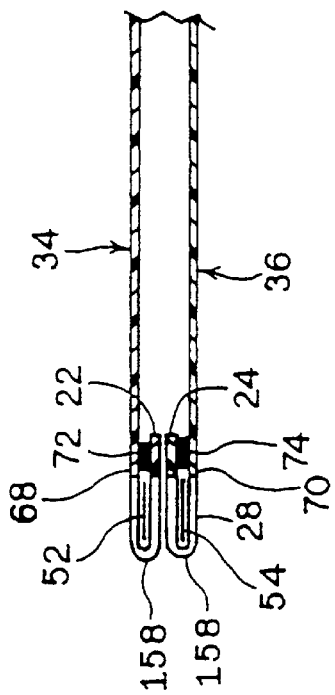
FIG. 2D
FIG. 2E
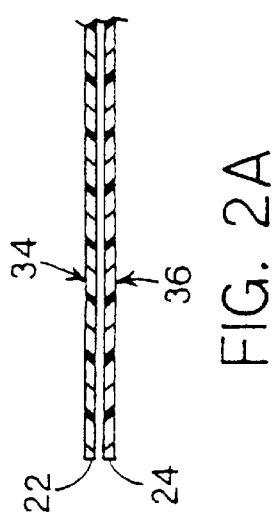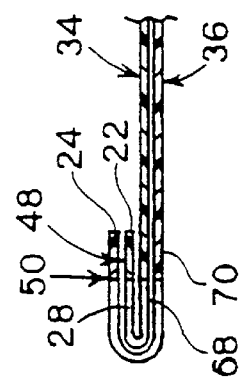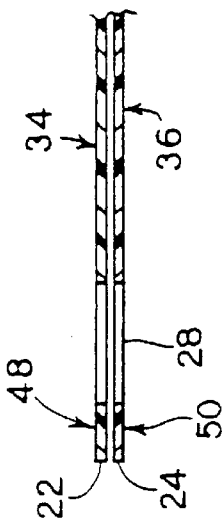
FIG. 2A
FIG. 2B
FIG. 2C

DRAW TAPE MACHINES

FIELD OF THE INVENTION

This invention relates to plastic bags characterized by a draw tape which, when pulled, causes the bag mouth to constrict to a substantially closed condition.

BACKGROUND OF THE INVENTION

Plastic bags of the type described here are typically comprised of a bag body folded to form top and bottom layers which are typically cut and sealed at the side edges. The front edges of the top and bottom layers, located opposite the fold, define the mouth of the bag. A near margin at the bag mouth is typically folded inside the bag to form a hem which is ordinarily sealed to the bag body to form a channel holding draw tapes. Pulling on accessible portions of the draw tapes causes the bag mouth to constrict thus closing the bag at its top.

Draw "string" bags have long been utilized, and have taken many forms. While drawstring bags made of plastic have been utilized to some extent, such bags have been used mostly in the lower volume boutique bag market because bags using draw "strings" tend to be more expensive. Much of the reason for this limitation in the market area is the cost of producing a draw "string" bag.

Manufacturing a plastic draw "string" bag typically requires special processing steps related to joining ends of the string being used. The string must be knotted, provided with a metal fastener, or otherwise fixed together at two ends in each such bag. Such processes cannot be carried out by the equipment usually associated with fabrication steps used to form seals and cuts in the plastic webbing from which the bag is derived. Accordingly, additional equipment must be used to so manipulate the draw "string," at related additional costs.

Subsequently, draw "tape" bags have been developed, first mostly in the boutique bag area, but now more generally for the higher volume markets. Draw tape bags represent a major advance in that a thermoplastic bag (e.g. low density polyethylene or linear low density polyethylene copolymer or the like) is provided with a thermoplastic tape (e.g. high density polyethylene), the tape being heat sealed into the bag during the process of manufacturing the bag. While draw "tape" bags in general represent a substantial improvement over draw "string" bags, there are still numerous difficulties in the production of the draw tape bags.

In making a draw tape bag in the conventional art, plastic film material is generally obtained in parent rolls. The roll is unwound and fed to a draw tape machine. The draw tape machine forms hems at edges of the web which ultimately form the top edges of the finished bag, and incorporates draw tape material into the hems, in addition to cutting holes at the edges which form the top edges of the finished bag. The hem is sealed, securing the tapes in the formed hems.

In the alternative, the plastic film material may be received in-line, from an ongoing film extrusion process.

In effecting the tape insertion, one or two strips of tape material are unwound from respective parent rolls and fed to the formed hems of the respective top and bottom layers. Accordingly, a draw tape machine must handle at least the main web which is used to form the plastic bag, as well as the one or two tape webs being inserted into the hems. Normally two sets of sealing bars or the like are required for forming the heat seals at the respective two hems after the tapes are inserted.

Finally, after the draw tape insertion process is completed, the web is transferred from the draw tape machine to a bag-forming machine where transverse side seals, and corresponding cuts, are made across the width of the plastic web, forming side seals and cutting the continuous web into individual bags, using conventional heat sealing and cutting equipment and methods. The steps that form the side seals and cut the sides of succeeding bags from each other also seal the draw tapes, in the hems, to the bag material, itself, along the side edges of the bags, as well as cutting the tapes to a length corresponding to the full widths of the bags being fabricated.

This invention focuses on the draw tape equipment. Web material processed in this invention is subsequently transferred to bag making equipment for further processing as into the finished individual bags. The equipment of the invention could readily be incorporated into the bag making machine such that the draw tape apparatus and bag making apparatus might be incorporated into one common frame and driven by a single common controller, integrating the several steps of the overall process of both the draw tape operation and the bag making and cutting operation. While such is certainly feasible with the invention as disclosed herein, the description herein focuses on the novel aspects of such apparatus which is in general defined in the draw tape equipment.

Early bag-making equipment was designed on the basis of intermittent motion. Namely the bag-making equipment would stop the plastic web for performing bag-making steps, whether for making side seals in the bags, cutting the bags apart from the web, or for performing one or more of the earlier steps such as those associated with forming hems at the top edge of the bags, or inserting tapes into such hems. After the desired step(s) were performed, transport of the bag was again started and the bag advanced to subsequent steps. More recently, continuous motion processing equipment has been developed wherein bag-making steps are performed while the bag advances continuously along a processing line.

However, even the most modern bag-making equipment still includes a variety of problems. Of particular concern in this invention is the apparatus used to form hems and incorporate draw tapes into the hems. There is also the issue of controlling the temperature of the parent web both before and after the hem sealing step. There is also the issue of minimizing the amount of floor space occupied by the bag forming machinery while retaining the web being processed where workers can reach it from floor level. Finally, there is the issue of improving handling of the parent web during its traverse through the bag forming operation.

It is an object of the invention to provide draw tape equipment and methods for forming hems around the draw tapes, rather than inserting the draw tapes into already-formed hems.

It is another object to provide draw tape draw tape equipment and methods wherein holes are formed adjacent the free edges of the plastic web before the free edges are folded for incorporation of draw tapes therein.

It is still another object to provide draw tape equipment and methods controlling the temperature of the parent web material both before and after applying sealing heat to formed hems.

It is yet another object to provide draw tape equipment and methods, separating edge regions of the top and bottom layers of the plastic and forming hem seals on both the top and bottom layers along parallel paths.

It is a further object of the invention to minimize the floor space occupied by the draw tape equipment while maintaining the web being processed at a level which can be reached by workmen standing on the floor of the work place.

Another object is to stretch the web adjacent the formed hems, with the draw tapes therein, prior to forming the seals at the formed hems.

A still further object is to electrostatically pin the formed hems to an underlying support, and to carry the thus pinned hems along the processing line on an intervening belt, thus controlling the transverse positioning of the hem with respect to hem sealing apparatus, for forming the hem seals.

A further object is to provide an angled turning member for assisting in returning the edge regions of the top and bottom layers into surface-to-surface contact with each other after the hem seals are formed along parallel paths.

SUMMARY OF THE INVENTION

Some of the objects are obtained in a first family of embodiments comprehending equipment for providing a draw tape in a plastic web, such as handle material for a plastic bag, the plastic web having top and bottom layers, first and second edge portions of the top and bottom layers respectively being folded onto respective first and second main body portions of the top and bottom layers, to form respective first and second hems, with respective first and second draw tapes being incorporated into the hems, the first and second edge portions being sealed to the respective main body portions to form first and second sealed hems, with the first and second draw tapes in the sealed hems. The equipment generally comprises hole forming apparatus forming holes, at spaced locations in the web, in the edge portions adjacent respective first and second free edges of the web; tape feed apparatus feeding first and second draw tapes, preferably into proximity with, and aligned with, the first and second edge portions; hem forming apparatus receiving the draw tape material as first and second draw tapes, forming the first and second hems and incorporating the draw tape material into the hems; and hem sealing apparatus sealing the first and second edge portions to the respective first and second main body portions of the respective layers, thus sealing the hems and securing the respective draw tapes therein.

The hole forming apparatus preferably includes an in-turn plow receiving the first and second edge portions of the web in a flat disposition and turning the first and second edge portions inwardly toward the main body of the web, a back-fold plow, receiving the in-turned edge portions and folding the edge portions back onto one of the first and second main body portions of the web, the back-fold plow having a notch, a hole cutter cutting holes in the web, and an out-turning plow receiving the first and second edge portions from the back-fold plow and restoring the first and second edge portions to a flat condition.

The hem forming apparatus is preferably disposed downstream in the processing sequence from the hole forming apparatus, the edge portions leaving the hole forming apparatus in an out-folded flat condition, and being re-folded to form the hems at the hem forming apparatus.

Preferably, the in-turn plow receives the web with the top layer in overlying contact with the bottom layer, and folds the first and second edge portions with the first edge portion of the top layer nested inside the second edge portion of the bottom layer.

In preferred embodiments, the hem forming apparatus forms the first and second hems about the first and second draw tapes.

It is preferred that the hem forming apparatus include first and second hem folding plows having first and second hem folding edges extending at first and second transverse angles to the direction of travel of the web and folding the first and second edge portions of the web, and first and second hem forming plows having hem forming edges extending at third and fourth transverse angles to the direction of travel of the web and receiving the first and second folded edge portions from the hem folding edges, and folding the folded edge portions back onto the respective first and second main body portions, thus forming the first and second hems. The hem folding plow preferably includes an aperture, the respective draw tape advancing through the respective aperture in the hem forming plow for forming of the respective hem about the tape. The first and second hem folding edges preferably comprise trailing edges of the hem folding plows, and the first and second hem forming edges comprise leading edges of the hem forming plows.

In preferred embodiments, the hem folding plows and the hem forming plows each have web contact surfaces contacting respective edge regions of the respective top and bottom layers, the web contact surfaces on the first hem forming plow and the first hem folding plow being disposed at a first obtuse angle to each other, and the web contact surface on the second hem forming plow and the second hem folding plow being disposed at a second obtuse angle to each other.

It is preferred that each draw tape advance over the respective hem folding plow in contact with the respective layer of web material in parallel with the folding of the edge portion of the respective layer by the respective hem folding plow, and that the draw tapes advance between the hem folding plows and the respective layers.

With respect to the hole forming apparatus, the in-turn plow preferably has a first outer edge disposed at a first angle from a free edge of the web, advancing inwardly across the web along the direction of travel of the web, and aligned with a second inner edge of the back-fold plow. The second inner edge is disposed at approximately the first angle. The back-fold plow has a third inner edge, intersecting the second inner edge and disposed at a second angle from the free edge of the web, corresponding generally to the first angle but advancing outwardly across the web along the direction of advance of the web. The out-turning plow has a fourth outer edge disposed at the second angle and aligned with the third inner edge of the back-fold plow. Respective loci on the first and fourth outer edges are aligned with each other along a transverse dimension of the web.

Generally, the back-fold plow has a fifth outer edge, the folded combined edge portions of the top and bottom layers traversing the notch at the fifth outer edge, the hole cutter cutting spaced holes in the edge portions of the web as the edge portions traverse the notch.

Preferably, the in-turn plow, the back-fold plow, and the out-turning plow have respective first, second, and third web guiding surfaces guiding the web adjacent the edge portions. The first and third web guiding surfaces are disposed at obtuse, preferably equal and opposite, angles with respect to the second web guiding surface.

The hem forming apparatus preferably includes a separating plow separating a second edge region of the bottom layer from the corresponding first edge region of the top layer.

The invention comprehends at least one turning member, preferably an upstanding turning cone, downstream of the hem forming apparatus, assisting in returning the edge regions into face-to-face relationship with each other. The invention comprehends a second turning member downstream of the turning cone, returning the separated one of the edge regions into face-to-face relationship with the other of the edge regions being effected by the turning cone.

The invention comprehends optional temperature control apparatus controlling the temperature of the web at the formed hems after, and preferably before, sealing the edge portions to the respective main body portions in forming the hem seals.

It is preferred that the hole forming apparatus be disposed up-stream in the equipment from the hem forming apparatus, forming holes, at spaced locations in the edge portions adjacent respective first and second free edges of the web before the hem forming apparatus forms the first and second hems.

The hem forming apparatus receives the draw tape material as first and second draw tapes, receives the edge portions of the web, unfolded, from the hole forming apparatus, with holes therein. The hem forming apparatus re-folds the edge portions, toward each other and onto first and second ones of the main body portions of the respective layers, and incorporates the draw tapes into the hems, thus forming the hems and incorporating the draw tapes inside.

The hem forming apparatus preferably includes a separating plow, separating first and second edge regions of the top and bottom layers from each other, for traverse along parallel but spaced first and second paths while holding the remainders of the widths of the top and bottom layers in surface-to-surface contact with each other.

Preferred embodiments include a separating notch formed by cooperating elements of the first hem folding plow and the separating plow, automatically initiating separation of the edge region of the bottom layer from the edge region of the top layer when the first and second edge regions traverse transversely across the separating notch.

The hem forming and sealing apparatus preferably includes stretching rollers applying transverse stretching forces to the respective layers at the first and second hems, with the draw tapes therein, upstream of the respective hem sealing elements. The stretching rollers have primary working surfaces generally urging the respective layers transversely at slight angles with respect to the general direction of the paths being traversed by the respective hems.

The equipment preferably includes an electrostatic pinning device downstream and adjacent each stretching roller, pinning the first and second formed hems to respective first and second underlying supports, and thereby controlling transverse positioning of the respective layers to the equipment downstream of the electrostatic pinning devices and upstream of and adjacent the respective hem sealing elements. The underlying supports generally extend under the respective hem sealing elements, and support the hems while the hems are being sealed. The stretching rollers generally apply force on the web directed against a flexible underlying support belt.

BRIEF DESCRIPTION OF THE DRAWINGS

FIGS. 2A–2E show cross-sections of the edges of the web at various stages in the process, and are taken at 2A—2A, 2B—2B, 2C—2C, 2D—2D, and 2E—2E of FIG. 2.

Figure 1:
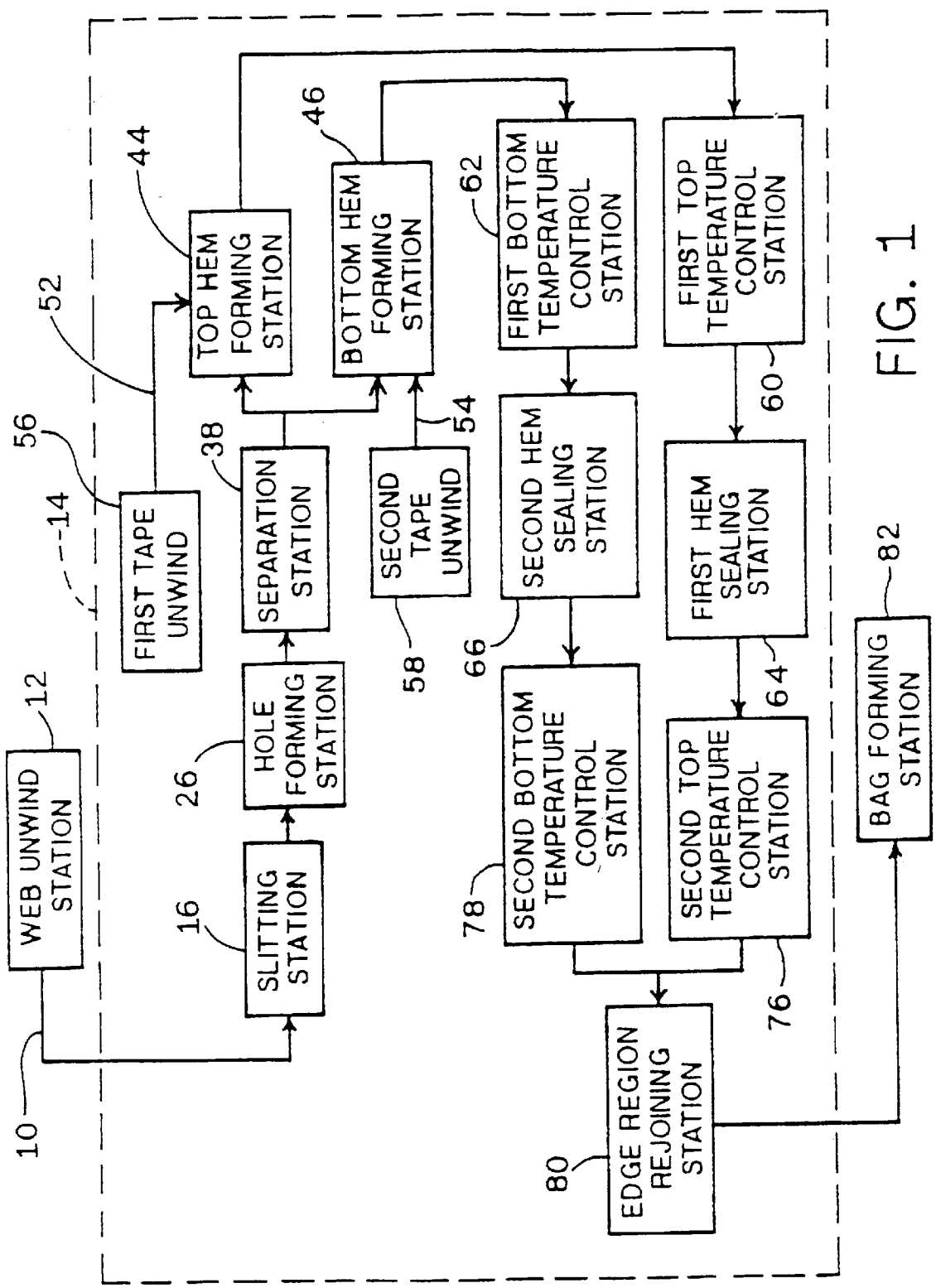
FIG. 1 shows a representative block diagram of primary work stations of equipment of the invention.

The invention is not limited in its application to the details of construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

Referring now by characters of reference to the drawings, FIG. 1 is a block diagram illustrating processing equipment used in the invention. In general, a continuous plastic web 10, generally a collapsed tube with top and bottom layers in surface-to-surface contact with each other, is unwound at a web unwind station 12 and is fed into a draw tape machine 14. The web 10 is drawn through the draw tape machine 14 by nip rollers, not shown, which are driven by conventional drive means, not shown. The web 10 moves along a path having a general direction as shown by the arrows 15 in the several FIGURES. See FIG. 2. The plastic web 10 is slit in draw tape machine 14 at a slitting station 16 to form top and bottom web layers 18, 20 having respective free edges 22, 24. The web then passes to a hole forming station 26 where holes 28 are punched in the top and bottom layers adjacent the free edges 22, 24. Edge regions 34, 36 of the top and bottom layers 18, 20 are then separated from each other at a separation station 38, immediately followed by forming of the first and second hems 40, 42 in the separated layers 18, 20 at respective hem forming stations 44, 46 arranged in parallel with each other. The hems are formed at edge portions 48, 50 of the layers 18, 20, including the free edges 22, 24.

Concurrent with the forming of the hems 40, 42, continuous draw tapes 52, 54 are fed from tape unwind stations 56, 58 to the hem forming stations 44, 46, and the hems are formed about the respective draw tapes 52, 54. The formed hems, with the draw tapes incorporated therein, then optionally pass through first temperature control stations 60, 62, where the temperature of the plastic web is controlled to a desired temperature. The formed hems then pass to hem sealing stations 64, 66 where the edge portions 48, 50 are sealed, generally at free edges 22, 24, to the main bodies 68, 70 of the respective top and bottom layers 18, 20, forming hem seals 72, 74.

The forming of the hem seals traps the draw tapes 52, 54 in the hems 40, 42. A narrow pressure wheel, described hereinafter, applies pressure to the hot seal to improve the seal quality. The sealed hems then optionally pass through second temperature control stations 76, 78, where the temperature of the plastic web is again controlled to a desired temperature.

The formed and sealed hems, with the draw tapes therein, then pass to the edge region rejoinder station 80, where the first and second edge regions 34, 36 are rejoined, in face-to-face relationship with each other, with the effect that the top and bottom layers are again in surface-to surface contact with each other over the entire transverse width of the web. The so processed web has draw tapes 52, 54 securely trapped in the hems 40, 42. The web then passes out of draw tape machine 14, and advances for further processing to e.g. a bag forming machine 82, where transverse heat seals and associated cuts are formed across the web, forming bag side seals which seal the draw tapes to the bags, and cutting individual bags from the continuous web 10.

Addressing a more detailed description of certain ones of the elements, attention is first turned to the hole forming station 26 and FIGS. 2–5. Hole forming station 26 includes first turning bar 84, generally arresting downwardly-sloped advance of web 10 and a second turning bar 86 generally turning the web back to an upwardly-sloped path of advance. In-turn plow 88, back-fold plow 90, and out-turning plow 92 operate on the edge portions 48, 50 of the web as the web traverses the hole forming station. In-turn plow 88 has a web contact surface 94 having a downwardly depending portion and a generally horizontal portion. Back-fold plow 90 has a generally horizontal web contact surface 96 comprising the bottom surface of the back-fold plow. Out-turning plow 92 has a web contact surface 98 having a generally horizontal portion and an upwardly depending portion. The downwardly depending portion of web contact surface 94 of the in-turn plow forms an obtuse angle "A1" with the web contact surface 96 of back-fold plow 90. The upwardly depending portion of web contact surface 98 of the out-turning plow forms a similar obtuse angle "A2" with the web contact surface 96 of back-fold plow 90. Angles "A1" and "A2" are generally equal, opposite, obtuse angles, measured from the bottom surface of the back-fold plow, generally taken in elevation view as in FIG. 4.

Figure 3:
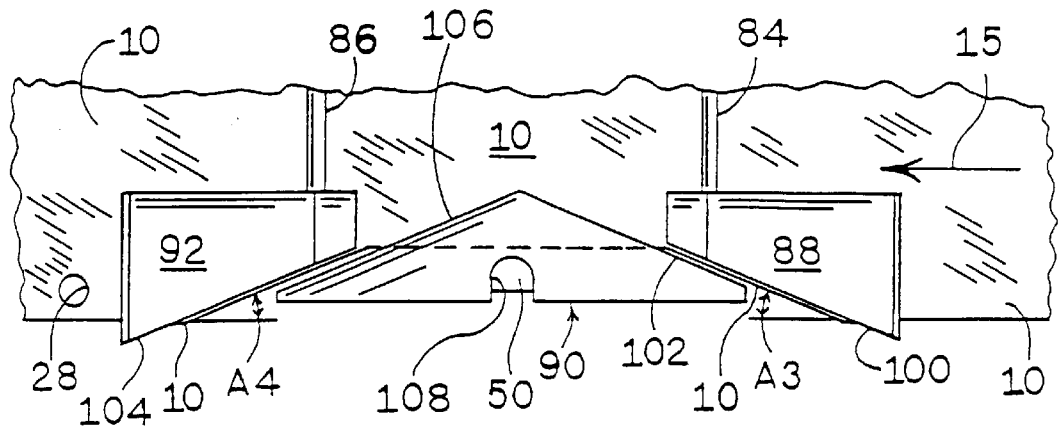
FIG. 3 shows a representative and fragmentary plan view of the hole forming station.
Figure 4:
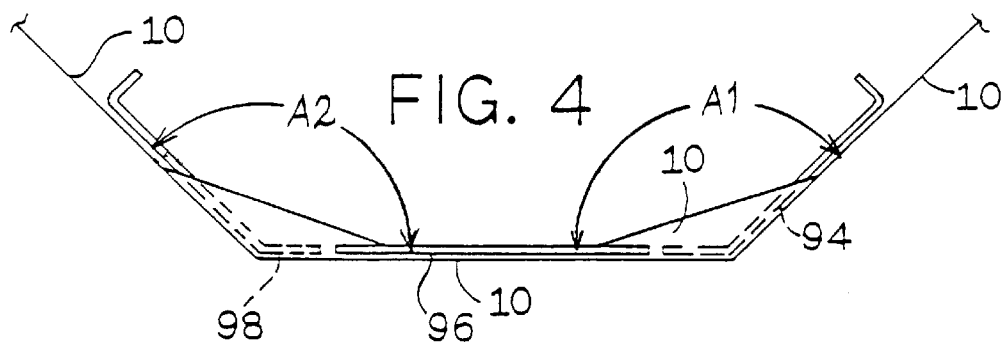
FIG. 4 shows a representative and fragmentary elevation view of the hole forming station.
Figure 5:
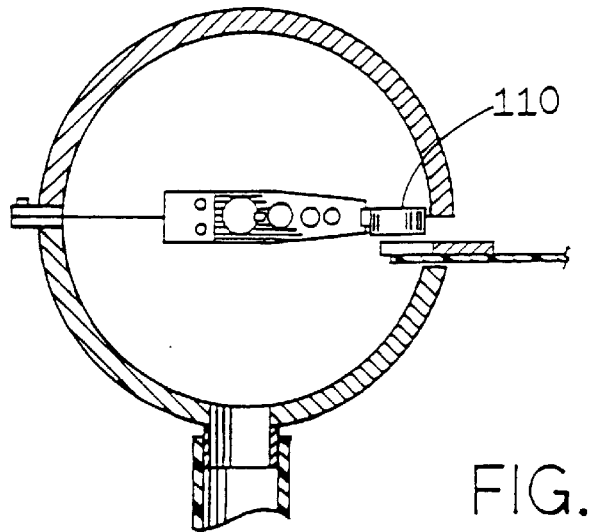
FIG. 5 shows a side cross-section of a hole cutter used in the invention.

In-turn plow 88 has an angled outer edge 100, adjacent the free edges 22, 24 of the web which outer edge 100 extends inwardly across the free edges of the web 10 along the direction of travel of the web at an angle "A3" seen in plan view in FIG. 3. Back-fold plow 90 has a first angled inner edge 102 defining approximately the same angle "A3" with respect to the free edges 22, 24 of the web 10. The angled inner edge 102 is generally aligned with the outer edge 100 of the in-turn plow 88, and comprises a continuation of the generally horizontal portion of the web contact surface 94.

Similarly, out-turning plow 92 has an angled outer edge 104, adjacent the free edges 22, 24 of the web which outer edge 104 extends outwardly across the free edges of the web 10 along the direction of travel of the web at an angle "A4" seen in plan view in FIG. 3. Back-fold plow 90 has a second angled inner edge 106 defining approximately the same angle "A4" with respect to the free edges 22, 24 of the web

10. The angled inner edge 106 intersects the inner edge 102 and is generally aligned with the outer edge 104 of the out-turning plow 92, and comprises an approximate continuation of the generally horizontal portion of the web contact surface 98.

Back-fold plow 90 includes a cutting notch 108 receiving a cutter 110 which cuts spaced holes 28 in the edge portions of the web as the edge portions pass through the hole forming station 26.

Figure 2:
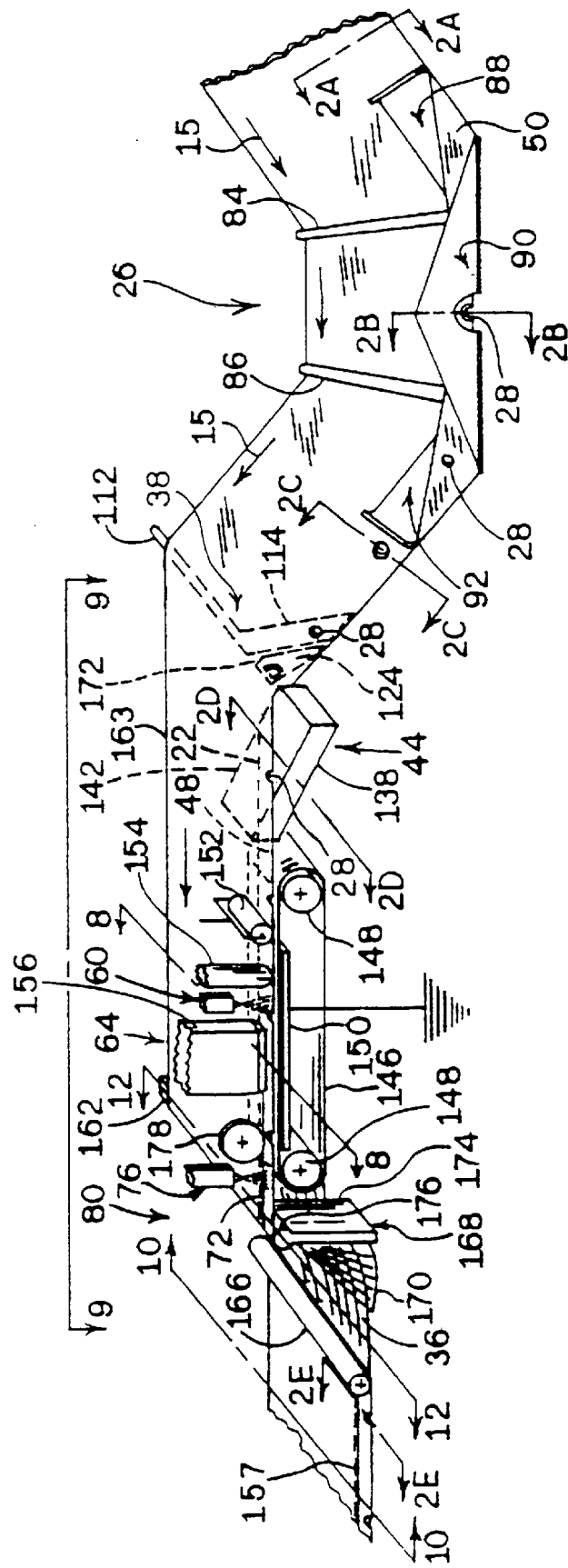
FIG. 2 shows a representative pictorial view of the hole forming station.
Figure 6:
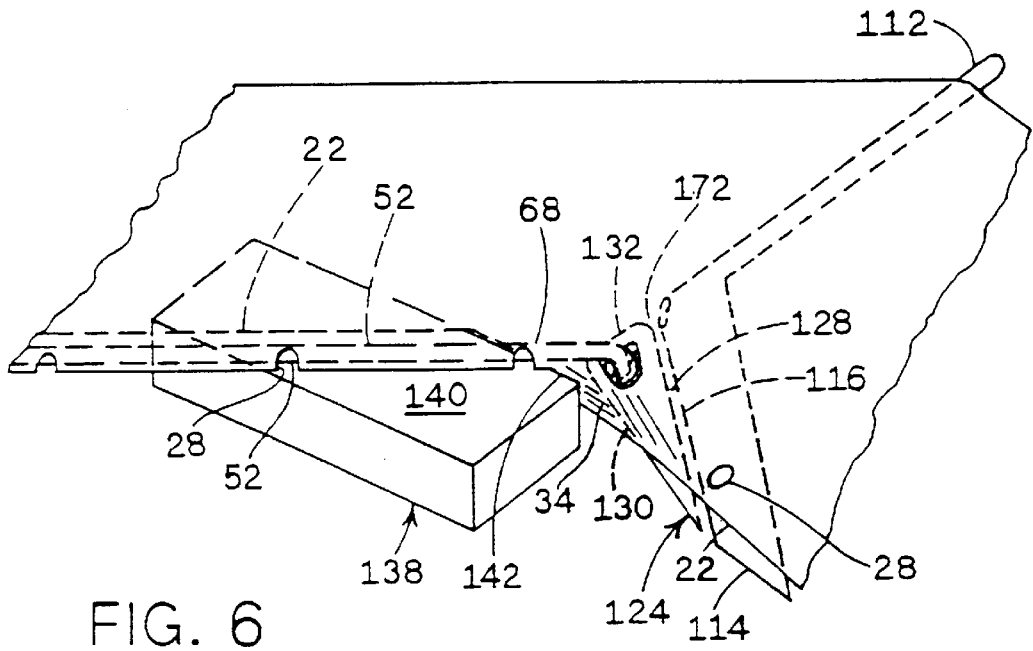
FIG. 6 shows an enlarged fragmentary view of the separation station and the first hem forming station.

FIGS. 2 and 6–8 illustrate detail of the separation station 38, and the close cooperation of the separation station 38 with the hem forming stations 44, 46. Turning first to FIGS. 2 and 6, as the web 10 leaves the hole forming station 26 the web travels along an upward path toward turning bar 112.

Separating plow 114 is mounted to turning bar 112 along the path of travel of the web 10, thus in part guiding the web in its upward travel. Separating plow 114 has a separating edge 116 angled inwardly along the direction of travel of the web. Separating edge 116 engages a progressively increasing portion of edge region 36 of the bottom layer as the web travels across the top surface 118 of the separating plow 114 toward turning bar 112, turning the edge region 36 in a downwardly directed path, relative to layer 18 and to the remainder of the bottom layer 20.

Figure 8:
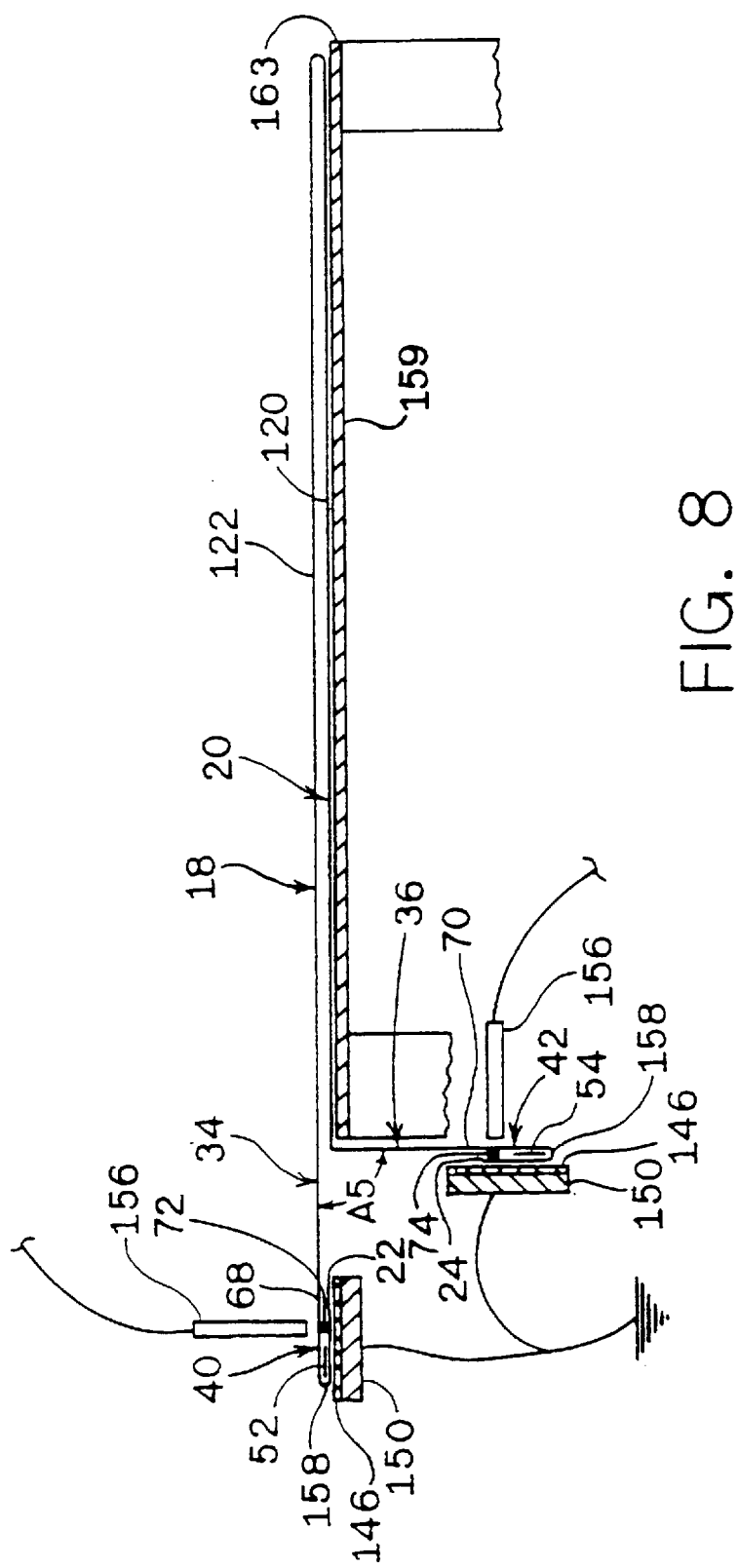
FIG. 8 is a cross-section taken at 8—8 of FIG. 2, showing the separated edge regions at the hem sealing stations.

As the primary portion of the bottom layer 20 turns about turning bar 112, the edge region 36 of the bottom layer moves into a vertical orientation. The remainder 120 of the bottom layer (namely the above mentioned "primary portion") is in a horizontal orientation, disposed at more or less 90 degrees to the edge region 36. The relative vertical orientation of the edge region 36 and the respective horizontal orientation of the remainder 120 of the bottom layer are illustrated in FIG. 8, where it is seen that the remainder 120 of the bottom layer 20 is in surface-to-surface contact with the remainder 122 of the top layer 18.

Thus the dihedral angle 'A5' (FIG. 8) formed between the planes of edge regions 34 and 36 may be as small as 30 degrees, or as large as 160 degrees, potentially up to nearly 180 degrees. Any and all angles in between are contemplated as possible, though angles closer to 90 degrees, such as between 75 and 105 degrees are contemplated as being most preferred.

Folding plow 124 is mounted along the path of travel of the web 10, beside separating plow 114. The top surface 126 of folding plow 124 forms a generally common surface with the top surface 118 of separating plow 114. Accordingly, the top layer 18 of web 10 is supported over a generally common top surface defined by the top surfaces of separating plow 114 and folding plow 124, in combination, which are aligned with the outer radius of turning bar 112. Folding plow 124 and separating plow 114 are separated by slot 128 which receives the edge region 36 of bottom layer 20 as the edge region 36 turns downwardly toward the vertical orientation seen in FIG. 8.

Hem folding plow 124 has a folding edge 130 extending across and progressively inwardly of the free edge 22 of the top layer 18, up to the level of the top of turning bar 112. The folding edge progressively folds the edge portion 48 downwardly as the web progresses along folding edge 130, such that the free edge 22 is disposed generally downwardly as edge region 34 passes over the top edge 132 of the folding plow 124.

Hem folding plow 124 further has an aperture 134, and a small turning roll 136 journalled in the aperture 134. The turning roll 136 has an outer working surface generally aligned with the upwardly sloped top web-engaging surface 126.

Figure 7:
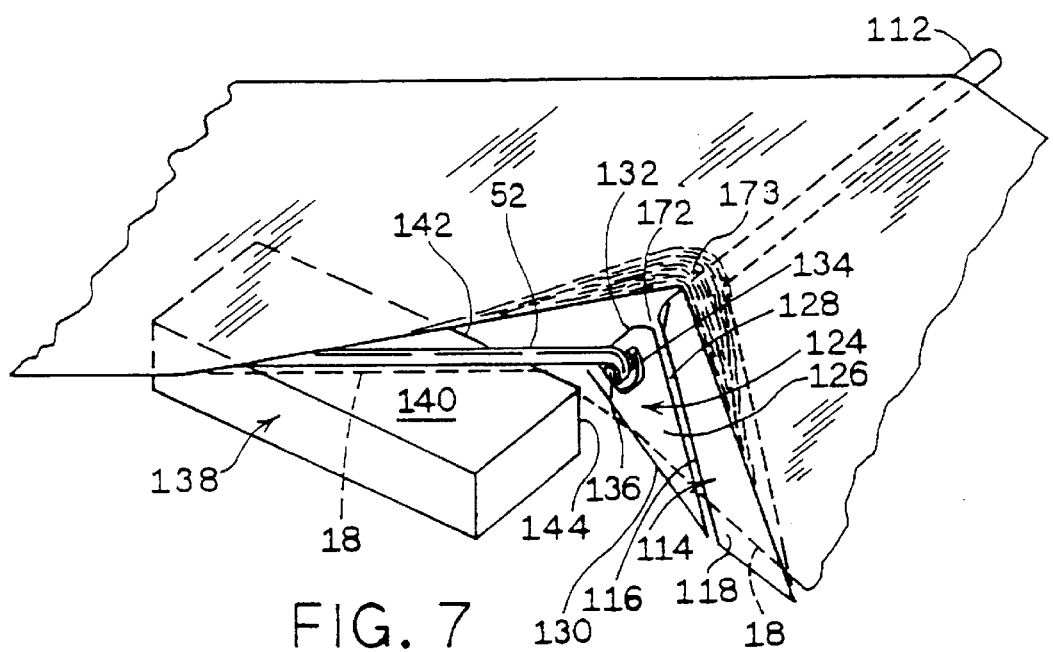
FIG. 7 shows an enlarged fragmentary view as in FIG. 6, with the web pulled back to illustrate the method of initiating separation of the edge regions.

Hem forming plow 138 has a generally horizontal surface 140 extending along the path of travel of the top layer 18, downstream of turning bar 112, separating plow 114 and folding plow 124, and generally level with the top of turning bar 112 and the top edge 132 of hem folding plow 124. The top surface 140 has an angled leading edge 142. An associated upstanding inner surface 144 extends inwardly across the free edge 22 of the top layer 18 when viewed along the direction of travel of the web 10, all as seen in FIGS. 2, 6 and 7. The edge portion 48 of top layer 18, which is down-turned at hem folding plow 124, engages the upstanding inner surface 144 and rides up and over leading edge 142. The oblique angle of leading edge 142 folds the already down-turned free edge 22 upwardly under the main body portion 68 of the layer 18, thus forming the hem 40.

As referred to herein, each layer 18, 20 has two main elements defined across the width of the respective layer, namely an edge region (34 or 36) and a remainder portion (120 or 122). Each edge region includes an edge portion and a main body portion. The edge portion is that portion of the edge region which is folded under at e.g. hem forming plow 138. The main body portion is all the rest of the respective edge region. Each edge portion includes the respective free edge (22 or 24). Each hem (40 or 42) is formed from the respective edge portion and an adjoining part of the respective main body portion, with the hem seal typically being formed at or near the respective free edge 22 or 24 on the edge portion.

While the hem 40 is being formed as described above, draw tape 52 is being fed from unwind station 56 through aperture 134, over turning roll 136, and into contact with the underside of top layer 18 as it progresses onto the top surface 126 of folding plow 124. Thus, the draw tape 52 advances into the hem forming operation along a path generally parallel in place and time to the path of the plastic material of layer 18. The draw tape advances between the top surface 126 of the hem folding plow and the underside of the layer 18, thence advancing together with the edge portion 48 of layer 18 across the top edge 132, past leading edge 142, and across the top surface 140 of hem forming plow 138.

As draw tape 52 approaches the leading edge 142, it is drawn into close proximity with the edge portion 48 of the top layer 18. The draw tape, itself, is in a horizontal orientation, extending along the length of the free edge 22 of the layer 18. As the leading edge 142 of the hem forming plow 138 folds the edge portion 48 of top layer 18 upwardly against the main body portion 68 of the top layer in forming the hem 40, the edge portion 48 enfolds the draw tape 52 between the edge portion 48 and the main body portion 68. Thus, the hem is formed about draw tape 52 in the process of incorporating the draw tape into the hem. In the process, the edge region 34 is maintained as a generally straight line extension of the remainder of the width of the top layer 18.

The edge portion 48 is somewhat wider, measured across the width of the web 10, than the draw tape 52. Thus, when edge portion 48 is folded up against main body portion 68, the free edge 22 extends past the full width of the draw tape and is in surface-to-surface contact with the main body portion 68 away from the folded edge 158 of the edge portion 48. The relationship of the draw tape in the folded edge portion is shown in detail in FIG. 8.

Figure 13:
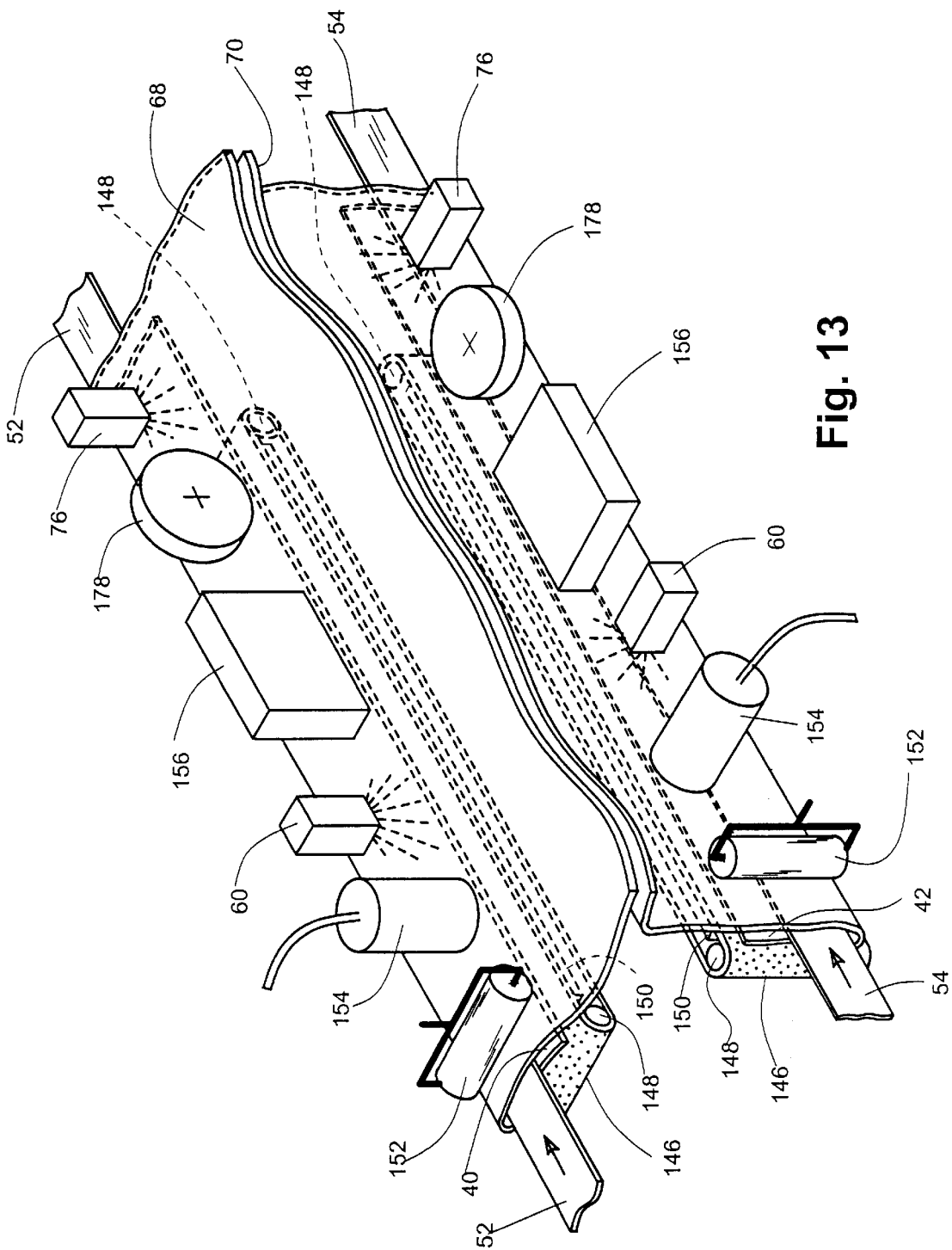
FIG. 13 is a partial perspective view of a machine of the invention showing elements operating on the top and bottom edges of the web layers.

Referring to FIGS. 8 and 13, duplicate sets of machine elements for operating on the hems in the top and bottom layers of the web are shown.

Endless support belt 146 is mounted for support and endless traverse under hem 40 downstream from hem forming plow 138 past electrostatic pinning device 154 and hem sealing device 156, to pressure wheel 178. Support belt 146 is mounted on a plurality of guide rolls 148 about an endless path. The guide rolls 148 are shown in FIG. 2. The downstream one of the guide rolls 148 provides support against which pressure wheel 178 presses. Support belt 146 is driven by conventional drive, not shown, at a surface speed matching the speed of advance of the web 10 at edge portion 48. Thus, the support belt moves with the hem thereon from approximately the hem forming plow to pressure wheel 178.

Support belt 146 is preferably rather flexible and can be made of, for example, reinforced polymer such as various natural and synthetic rubbers or other polymers or copolymers, or the like. Belt 146 may, of course, include conventional additives for controlling surface characteristics such as slip and the like. Examples of such additives are the silicones and fluorinated polyethylenes, such as polytetrafluoroethylene, also known as Teflon ®.

Downstream of the hem forming plow, the edge portion 48 passes under stretching roll 152, electrostatic pinning device 154, first temperature control device 60, and heat seal device 156.

Support bar 150 underlies and supports support belt 146 along the portion of the path which passes under the electrostatic pinning device, and the heat seal device. Support bar 150 is stationary, and physically supports support belt 146 against physical downward forces.

Support bar 150 is electrically conductive, and is electrically grounded, whereby the support bar 150 presents an electrical ground cooperative with the electrostatic pinning device 154 for electrostatically pinning the non-conductive material of the plastic web 10 to moving support belt 146 after the edge portion 48 has been stretched by stretching roll 152. Support bar 150 is preferably metal or other suitably rigid conductive material.

Stretching roll 152 is mounted over the edge portion 48 at a slight angle to the direction in which the web 10 is moving, and presses downwardly against the edge portion 48, with the edge portion 48 being supported by resiliently flexible support belt 146. Thus, the working surface of stretching roll 152 is disposed at a slight angle (e.g. less than 20 degrees, for example about 5 degrees to about 10 degrees) to a perpendicular e.g. line 155 extending transversely across the web 10. Stretching roll 152 works against primary resistance of support belt 146, which can be pushed down slightly by roller 152. Thus, the web moves freely transversely in removing wrinkles and the like until support belt 146 reaches support bar 150 in the vicinity of electrostatic pinning device 154.

Accordingly, the force exerted against the edge portion 48 urges the edge region 34 of layer 18 outwardly with respect to the web, stretching the web in the transverse direction and pulling wrinkles out of the film. At the same time, stretching roll 152 squeezes out air from between the edge portion 48 and main body portion 68 inside the formed hem 40.

Electrostatic pinning device 154 is mounted proximately downstream of the stretching roll 152 immediately after the stretching at stretching roll 152, over the edge portion 48. Pinning device 154 electrostatically pins the edge portion 48 against the moving support belt 146. The electrostatic pinning device thus effectively pins the edge portion 48 of stretched layer 18 to the moving belt 146 for the full length of the support bar 150, substantially from a point slightly downstream of the stretching roll 152 until after the hem seal 72 has been formed at sealing device 156 and pressure wheel 178 and set/cooled at the second temperature control device 76. Thus, the pinning device fixes the layer against transverse movement while the hem seals are being formed and set.

Heat seal device 156 is mounted downstream of electrostatic pinning device 154, over edge portion 48, and positioned approximately over the folded-under free edge 22 of the top layer. Heat seal device 156 can be any of the conventionally known heat seal devices which form heat seals on continuously moving plastic webs. As the edge portion 48 passes under the heat seal device, both the edge portion 48 and the main body portion 68, of edge region 34, are being supported by support belt 146. A stream of hot air from the heat seal device heats the main body portion 68 adjacent free edge 22, softening both the main body portion and the free edge, and forming bonds therebetween in creation of heat seal 72 along a line, extending along the length of the web, between the main body portion 68 and the edge portion 48 at or adjacent free edge 22. Other types of heat seal devices could be used, such as infrared heaters.

Pressure wheel 178 then exerts modest downward pressure on the softened materials to fuse, and thus bond the softener materials to each other.

First temperature control device 60 is mounted proximately downstream of the pinning device 154, over main body portion 68, which is over edge portion 48. The temperature control device 60 projects cooling (or heating) fluid such as cooling (or heated) air or a mist or stream of water onto the main body portion 68 immediately prior to the combination of the main body portion and the edge portion passing under the heat seal device 156. Thus, the temperature control device 60 imparts a predictable, controlled temperature at the edge portion 48 immediately upstream of hem seal forming at heat seal device 156.

A second temperature control device 76 is mounted proximately downstream of the heat seal device 156 and downstream of pressure wheel 178, over main body portion 68 at edge portion 48. The temperature control device 76 projects cooling fluid such as cooling air or a mist or stream of water onto the main body portion 68 shortly after the main body portion and the edge portion pass under the pressure wheel 178. Thus, the temperature control device 76 provides cooling to the seal 72 to set the seal and cool the seal thus to avoid residual heat inadvertently bonding portions of the web to each other downstream of the pressure wheel 178.

Figure 12:
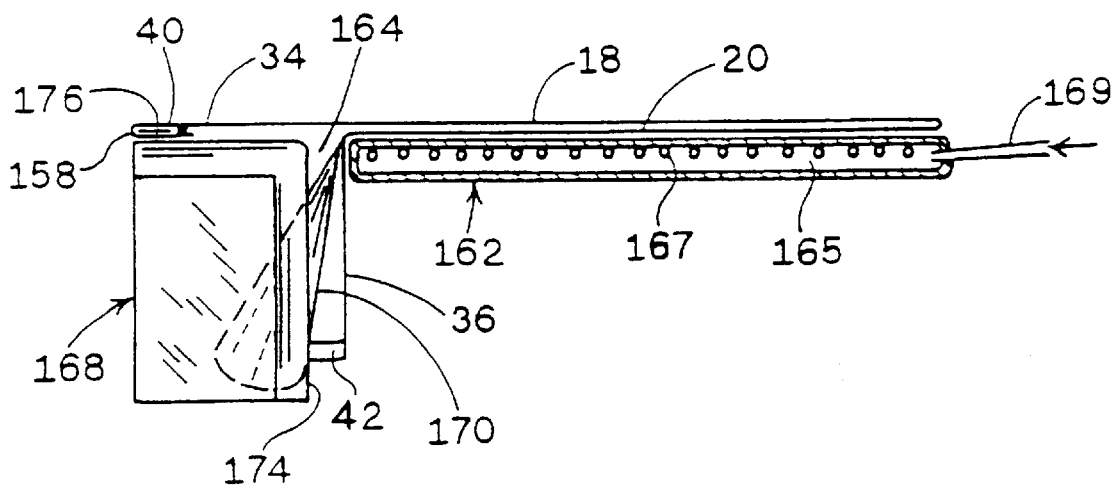
FIG. 12 is a cross section taken at 12—12 of FIG. 2.

The remainders 120, 122 of the layers remain in surface-to-surface contact with each other over the entire path traversed by the web through the draw tape machine. Between turning bar 112 and turning bar 162 the remainders 120, 122 of the layers are supported by a support table illustrated generally by the element 159 (FIG. 8). At the end of the support table, the remainders 120, 122 traverse a turn of about 45 degrees over turning bar 162. Turning bar 162 is hollow as illustrated in FIG. 12, having an inner chamber 165 therein, and being closed at both ends. A row of air ports 167 extends from the inner chamber 165, through the outer wall of bar 162, to the outer surface of the turning bar, at about 22 degrees, trailing, from the top of turning bar 162. Low pressure compressed air is fed into the inner chamber 165 by an air line 169, and out the air ports 167 to provide a lubricating air cushion positioned generally mid-way along the path of turning contact between the bottom layer 20 and turning bar 162, to assist the turning of the remainders 120, 122 about the turning bar 162.

Turning bar 162 is mounted downstream of the second temperature control device 76. Turning bar 162 extends from generally the back edge 163 of the support table 159 to edge region 34, and thus stops well short of edge portion 48. Thus, edge portion 48 is not supported by turning bar 162.

Turning plate 168 has a rounded vertical edge 174, and a rounded horizontal turning edge 176. Turning edge 176 has a radius of curvature generally corresponding to the working surface of turning bar 162, and functionally comprises an extension of turning bar 162, along edge region 34. The turning bar 162 ends remote from edge portion 48. A gap 164 is disposed between the turning bar 162 and the turning edge 174 of turning plate 168. Rejoinder turning roll 166 is positioned downstream of, and is vertically downwardly displaced from, turning bar 162 and turning edge 176.

The entirety of top layer 18 passes over the functional combination of turning bar 162 and turning edge 176 and passes downwardly under rejoinder turning roll 166. The remainder 120 of bottom layer 20 passes over turning bar 162 while the vertically downwardly disposed edge region 36 passes through gap 164, about vertical turning edge 174, and over upstanding turning cone 170.

Turning cone 170 engages the edge region 36 (FIGS. 2, 11, and 12) directly downstream of the turning edge 174 and turns the edge region 36 gradually over the conical surface of cone 170 from a vertical orientation toward a more horizontal orientation, such that the edge region 36 leaves the turning cone disposed at an angle of about 40–50 degrees (FIG. 10), preferably 45 degrees, from the vertical. The edge region 36 continues the transition toward a horizontal orientation as it moves toward rejoinder turning roll 166. Edge region 36 finally reaches a horizontal orientation as it passes under turning roll 166, simultaneously rejoining edge region 34 of top layer 18.

Figure 10:
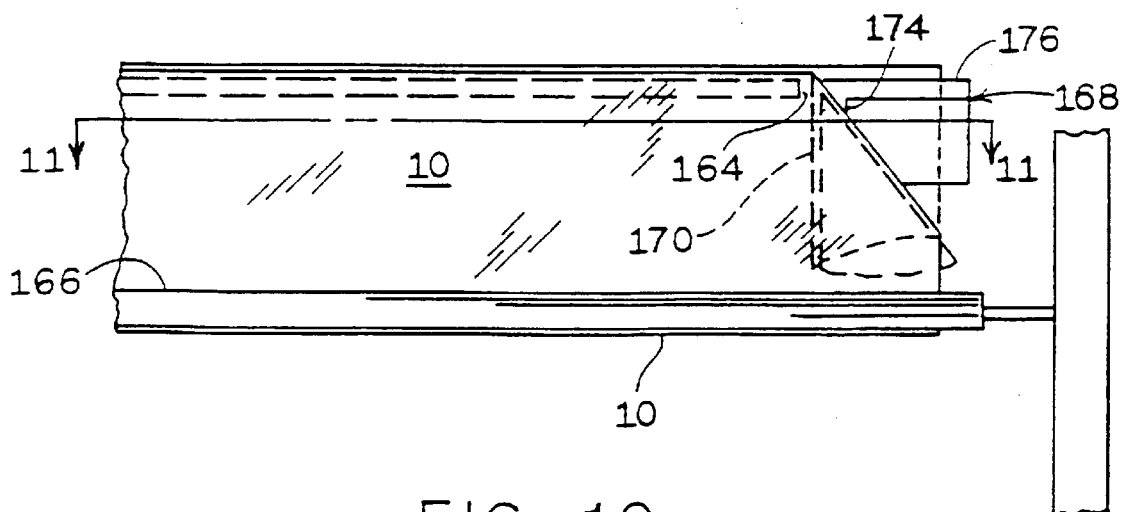
FIG. 10 is a fragmentary end elevation taken at 10—10 of FIG. 2.
Figure 11:
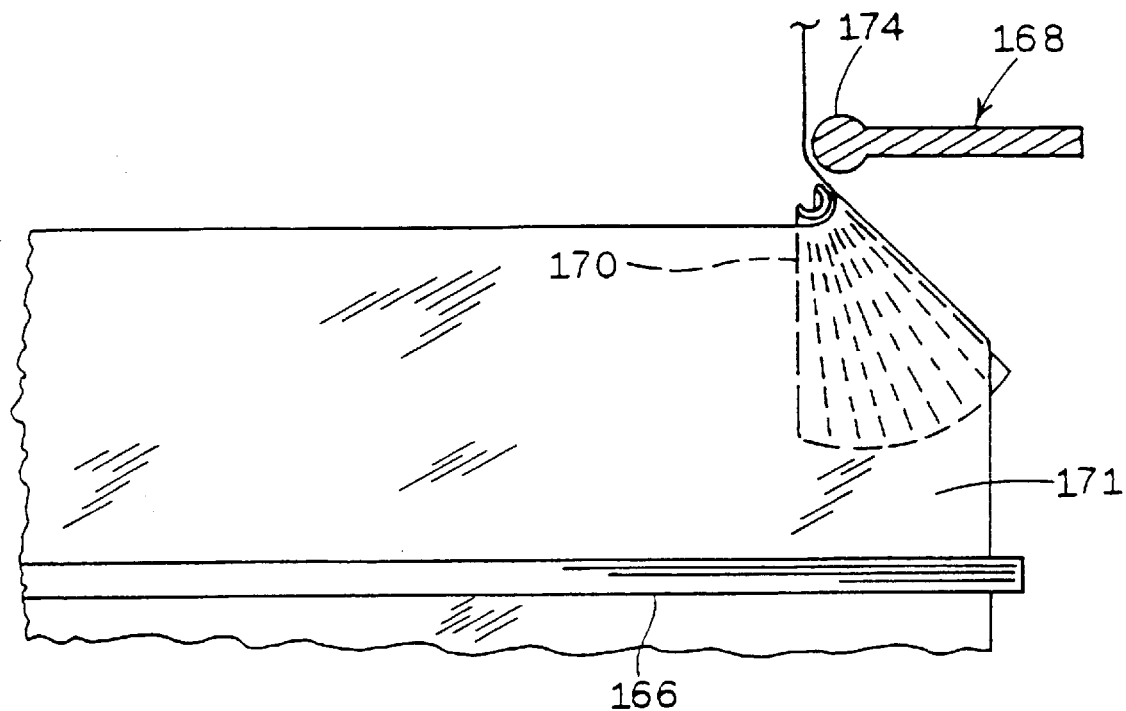
FIG. 11 is a partial section taken at 11—11 of FIG. 10.

FIGS. 10 and 11 show some detail of the process as the edge region 36 achieves a full 90 degree turn, which may be considered an edge rotation over a distance travelled, from vertical to horizontal as it passes over turning cone 170. Edge region 36 makes the rotation around turning cone 170 and joins edge region 34 of the top layer 18 at rejoinder turning roll 166.

At rejoinder turning roll 166, the web 10 comprises the full widths of top and bottom layers 18, 20, with draw tapes 52, 54 in the sealed hems 40, 42. The web 10 passes from turning roll 166 to a driven nip, not shown, and then out of the draw tape machine 14, to bag forming station 82 which forms e.g. transverse heat seals and cuts in the web to seal the bag sides and cut individual bags from the continuous web.

While not shown in the same detail as above, draw tape 54 is incorporated into the hem 42 in bottom layer 20 using like steps. Thus, the tape incorporation process at bottom layer 20 uses a folding plow 124 including aperture 134, a forming plow 138 including surfaces 140, 144, and angled leading edge 142, incorporating draw tape 54 into the hem 42, as well as a stretching roll 152, an electrostatic pinning device 154, first and second temperature control devices 60, 76, heat seal device 156, and pressure wheel 178.

While included in the preferred embodiment illustrated, temperature control devices 60, 76 are optional, and either such temperature control device may be used alone, or the control devices 60, 76 may be used together. The exact location of the temperature control devices can vary and still have the same effect.

Returning now to FIGS. 6 and 7, and looking downstream along the processing line, the top left corner of separating plow 114 and the top right corner of folding plow 124 define a separating notch 172 therebetween. Specifically, notch 172 is defined by upper facing edges of the respective plows which converge downwardly toward each other along the slot 128. In some embodiments, the slot 128 should be widened at the notch. Thus, an insert, not shown, is preferably added at the top edge e.g. at 132, where the top and bottom folding plows 124 meet. With the notch properly dimensioned, the notch causes automatic initiation of feeding of the edge region 36 of bottom layer 20 through slot 128 while feeding the edge region 34 transversely over hem folding plow 124. Thus, for use with e.g. low density polyethylene bag material having a thickness of about 0.001 inch each layer, one embodiment of the notch has an opening at its top of about 0.19 inch, an angle at the insert of about 60 degrees from horizontal, and a depth, from the widest to the narrowest opening represented by the notch 172, of about 0.33 inch.

FIG. 7 illustrates the method of starting the bottom edge region 36 feeding downwardly through the slot 128. With the plastic web 10 being driven slowly along the processing line, under tension, such as at about 15 to about 600 feet per minute, the operator pushes the edge region 36 of bottom layer 20 across the separating notch while keeping the edge region 34 extended across slot 128, and across folding plow 124. The edge region 36 is thus bunched up adjacent the notch as shown by the shaded area 173 of the web in FIG. 7. It should be noted that, in FIG. 7, part of the edge portion 34 of top layer 18 is shown in dashed outline, showing underlying layer 20 in full line drawing.

The operator then releases the edge region 36, preferably with the web still moving along the processing path, and allowing the bunched-up edge region 36 of bottom layer 20 to gradually move transversely back toward the notch as the web continues to advance under draw tension.

As the edge region 36 moves back toward the notch 172, the edge of the bottom layer begins feeding downwardly into the notch 172. As the web continues to advance, the edge region 36 becomes fully deployed through notch 172, resulting in subsequent smooth feeding of the edge region 36 downwardly through the notch in the continuous feed process characteristic of the equipment of the invention. This provides a fast, easy way to thread the hem forming station 46. The edge region 36 can, of course, be threaded through slot 128 by hand, with or without forward driving of the web 10.

FIGS. 2A, 2B, 2C, 2D, and 2E illustrate the configurations of the edges of the web at various stages of the process. Thus, FIG. 2A shows the free edges 22, 24, and thus the edge portions 48, 50, after the slitting operation, overlying each other at the beginning of the process of forming the hems and incorporating the draw tapes thereinto.

FIG. 2B shows the edge portions 48, 50 folded back onto the main body portion 68 of the top layer, with holes 28 having been simultaneously cut in both layers by the hole cutter 110. Folded-over edge portion 48 of top layer 18 is nested inside folded-over edge portion 50 of bottom layer 20.

FIG. 2C shows the edge portions after being unfolded to the flat condition at out-turning plow 92.

FIG. 2D shows the edge portions 48, 50 re-folded, inwardly against the main body portions 68, 70 and with the draw tapes 52, 54 received therein.

FIG. 2E shows the edge portions 48, 50 after the edge regions have been rejoined at turning roll 166. The edge regions 34, 36 are again overlying each other, with the hems formed, sealed, and facing each other, and with the draw tapes secured therein by the seals 72.

It is contemplated that the operation and functions of the invention have become fully apparent from the foregoing description of elements, but for completeness of disclosure the usage of the invention will be briefly described.

A flattened tubular web 10 having opposing edges is unwound from web unwind station 12 and fed to the draw tape machine 14. As the flattened web 10 enters the draw tape machine 14, it is slit at one of the edges to form free edges 22, 24, which will be disposed at the tops of the bags to be fabricated from the web 10.

The web then advances downwardly toward the hole forming station 26. As the web advances toward turning bar 84, the slit free edges 22, 24 pass under in-turn plow 88 at web contact surface 94, and both free edges 22, 24 are folded upwardly about edge 100, as the main body of the web passes around turning bar 84 at an obtuse angle, to a horizontal disposition, and edge portions 48, 50 pass toward the back-fold plow 90. The edge portion 48 is nested inside edge portion 50. The upwardly folded edge portions 48, 50 are engaged by inner edge 102 of back-fold plow 90 and are folded back to a 180 degree orientation with respect to the main body portion 68 of the top layer.

With both edge portions 48, 50 folded back 180 degrees onto main body portion 68, the edge portions pass along the web contact surface 96 of back-fold plow 90, and through cutting notch 108. Cutter 110 cuts holes in the back-folded edge portions at spaced locations along the length of the web as the web advances through the cutting notch. Suitable cutter 110, and operation of such cutter, are taught in U.S. Pat. No. 4,664,649 Johnson et al, herein incorporated by reference.

As the web advances past the cutting notch, the folded edge portions 48, 50 are unfolded by operation of inner edge 106 of back-fold plow 90 in combination with outer edge 104 of out-turning plow. The folded edge portions are turned generally into a vertical orientation as they leave inner edge 106 and as the main body of the web passes about turning bar 86 at an obtuse angle and begins advancing upwardly. As the edge portions are engaged by outer edge 104 the edge portions are fully unfolded such that the edge portions 48, 50 are flat, e.g. straight line extensions of the remainders 120, 122 of the respective layers 18, 20. FIG. 2 illustrates the holes 28 in the web at the edge portions after traversing the hole forming station.

The advancing web next encounters the separating plow 114, and at about the same time hem folding plow 124. The edge region 36 of bottom layer 20 passes downwardly through the slot 128 between the folding plow 124 and the separating plow 114. The edge region 34 of the top layer advances over the top surface 126 of folding plow 124. The edge region 36 concurrently advances over a corresponding folding plow (not shown) below the level of support table 159.

The rest of the description here will describe the folding and sealing steps only with respect to the top layer 18. However, like steps also are performed with respect to the bottom layer 20.

As the edge portion 48 advances over the folding plow 124, the edge portion 48 is folded vertically downwardly by trailing folding edge 130. The downwardly depending edge portion 48 is engaged by the leading folding edge 142 of hem forming plow 138, and folded upwardly against and onto the main body portion 68 of the layer, thus completing formation of the hem 40.

As the hem 40 is being folded, draw tape 52 is fed around turning roll 136, out of the hem folding plow 124 at aperture 134, between the main body portion 68 of layer 18 and the top surface 126 of the folding plow. As the hem 40 is being formed, the draw tape 52 is fed over the leading edge 142 and across the top surface 140 of hem forming plow 138. Thus, as the downwardly depending edge portion 48 is folded upwardly against and onto the main body portion 68, the edge portion 48 is folded under the draw tape 52 which is advancing across the top surface 140. Thus, the upward folding of the edge portion 48 against the main body portion 68 engages the draw tape 52 between the edge portion and the main body portion 68, with free edge 22 extending beyond the draw tape 52 and engaging the main body portion 68 in surface-to-surface contact (FIG. 8).

With the hem thus formed, the hem is passed under stretching roll 152 where any wrinkles or the like are stretched out of the edge region 34. With the edge region stretched, the edge portion is then electrostatically pinned to the support belt 146, with support bar 150 cooperating in providing the electrical pinning force. The support belt 146 moves at the same linear speed as the web 10, whereby the support belt moves along generally carrying the edge portion 48 through the rest of the hem fabrication steps.

The stretched, pinned edge region then passes under the first temperature control station 60 where a controlled temperature fluid is imposed against the edge portion, such as air, or atomized water e.g. a water mist, cooling or heating the edge region as appropriate to provide a predetermined temperature to the edge region in preparation for the step of forming heat seals at heat seal device 156 and pressure wheel 178, sealing the formed hems.

Figure 9:
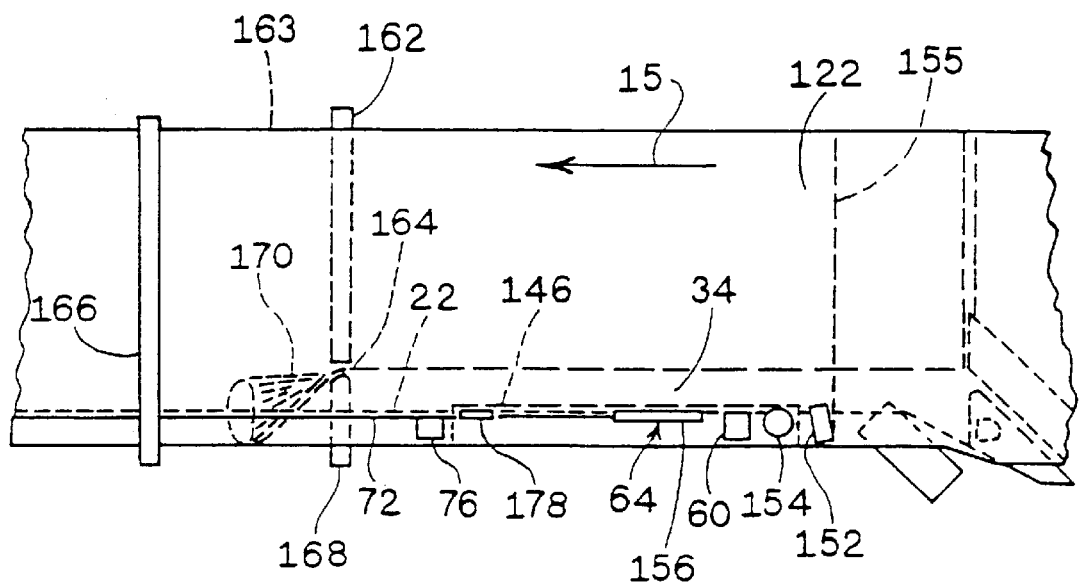
FIG. 9 is a top view of equipment of the invention taken at 9—9 in FIG. 2, including a showing of the hem forming area and the hem sealing area.

The temperature controlled edge region then passes to the hem seal station 64 at heat seal device 156. Concentrated heat such as hot air is applied to the main body portion of the web opposite the free edge 22, softening the main body portion and the adjacent elements of the edge portion, preferably at the free edge. The facing lines of softened material in main body portion 68 and edge portion 48 then pass under pressure wheel 178 which presses against the rear guide roller 148, as shown in FIGS. 2 and 9. The pressure urges the lines of heat softened material together in bonding contact, such that the continuous-line seal 72 is formed between the edge portion 48 and the main body portion 68. Thus is formed heat seal 72, joining the free edge and the main body portion, and thus closing and sealing the hem along the continuous line.

The sealed hem then passes under the second temperature control station 76 where a controlled temperature fluid, such as air, or atomized water e.g. water mist, is again imposed against the edge portion, cooling the edge region so that the plastic is not inadvertently bonded to itself at unintended locations.

After cooling, the layer 18 passes over turning bar 162 and downwardly under turning roll 166. Meantime, the edge region 36 of the bottom layer, also hemmed, sealed, and cooled, passes about vertical turning edge 174, turning cone 170, and turning roll 166 in the process of rotating from its downwardly extending vertical orientation to a horizontal orientation. The edge regions 34, 36 are rejoined in surface-to-surface contact with each other at turning roll 166, and then proceed through the above-mentioned driven nip.

The web, having been hemmed, the draw tapes 52, 54 incorporated into the hems, the hems sealed, and the edge regions rejoined to each other, the web passes out of the draw tape machine for further processing steps which form no part of this invention.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A machine for providing a draw tape in a plastic web, the plastic web having top and bottom layers, the top layer having a first main body portion, a first top layer edge portion, and first top layer free edge, the bottom layer having a second main body portion, second bottom layer edge portion, and second bottom layer free edge; the first and second edge portions of the top and bottom layers respectively being folded onto respective first and second main body portions of the top and bottom layers, to form respective first top layer and second bottom layer hems, with respective first top layer and second bottom layer draw tapes being incorporated into the hems, the first and second edge portions being sealed to the respective main body portions to form first top layer and second bottom layer sealed hems, with the first top layer and second bottom layer draw tapes in the respective sealed hems, said machine comprising:

(a) hole forming apparatus forming holes, at spaced locations in the web, in the edge portions adjacent respective first and second free edges of the web;

(b) tape unwind apparatus following the hole forming apparatus for feeding first and second draw tapes into proximity with, and aligned with, the first and second edge portions;

(c) hem forming apparatus adjacent the tape unwind apparatus for separating first and second edge regions of the top and bottom layers from each other, for traverse along parallel but spaced first and second paths while holding the main body portions of the top and bottom layers in surface-to-surface contact with each other, the first and second edge regions including the respective first and second edge portions and the respective first and second free edges, said hem forming apparatus for receiving the first and second draw tapes, and for forming the first and second hems and incorporating the draw tapes therein; and (d) hem sealing apparatus downstream from the hem forming apparatus for sealing the first and second edge portions to the respective first and second main body portions of the respective layers, thus sealing the hems and securing the respective draw tapes therein.

2. The machine as in claim 1, said hem forming apparatus including first and second hem folding plows having hem folding edges, and a separating plow adjacent said first hem folding plow, said separating plow separating the second edge region of the bottom layer from the corresponding first edge region of the top layer, the separated first and second edge regions, at corresponding points along the first and second paths, lying in surfaces intersecting each other along an imaginary line having a component extending in the direction of travel of the web.

3. The machine as in claim 2, including a separating notch formed by cooperating elements of said first hem folding plow and said separating plow, automatically initiating separation of the edge region of the bottom layer from the edge region of the top layer when the first and second edge regions traverse transversely across said separating notch.

4. The machine as in claim 2, said hem folding plows having hem folding edges extending at transverse angles to the direction of travel of the web.

5. The machine as in claim 4, said hem forming apparatus including first and second hem forming plows receiving folded edge portions of the web from said hem folding edges, and folding the folded edge portions back onto the respective main body portions forming the respective hems.

6. The machine as in claim 1, said hem forming apparatus being disposed downstream in the processing sequence from said hole forming apparatus, whereby the edge regions are separated after leaving said hole forming apparatus.

7. The machine as in claim 1, said hem forming apparatus forming the first and second hems about the first and second draw tapes.

8. The machine as in claim 1, said hem forming apparatus including first and second hem folding plows having first and second hem folding edges extending at first and second transverse angles to the direction of travel of the web and folding the first and second edge portions of the web, and first and second hem forming plows having first and second hem forming edges extending at third and fourth transverse angles to the direction of travel of the web and receiving the first and second folded edge portions from said hem folding edges, and folding the folded edge portions back onto the main body portions, thus forming the first and second hems.

9. The machine as in claim 8, each said hem folding plow having an aperture therein, the respective draw tape advancing through the respective aperture in said hem folding plow for forming of the respective hem about the tape.

10. The machine as in claim 9, the respective draw tapes advancing between each said hem folding plow and the respective layers.

11. The machine as in claim 8, said first and second hem folding edges comprising trailing edges of said hem folding plows, said first and second hem forming edges comprising leading edges of said hem forming plows.

12. The machine as in claim 8, and wherein each said draw tape advances over the respective said hem folding plow in contact with the respective layer of web material in parallel with the folding of the edge portion of the respective layer by the respective said hem folding plow.

13. The machine as in claim 1, said hem forming apparatus including a separating plow separating the second edge region of the bottom layer from the corresponding first edge region of the top layer.

14. The machine as in claim 1, including at least one turning member downstream of said hem forming apparatus, assisting in returning the edge regions into face-to-face relationship with each other.

15. The machine as in claim 14, said at least one turning member comprising an upstanding turning cone.

16. The machine as in claim 1, including a turning member downstream of said hem forming apparatus, turning portions of the top and bottom layers, and air lubrication between said turning member and the bottom layer.

17. A machine for providing a draw tape in a plastic web, the plastic web having top and bottom layers, the top layer having a first main body portion, a first top layer edge portion, and first top layer free edge, the bottom layer having a second main body portion, second bottom layer edge portion, and second bottom layer free edge; the first top and second bottom edge portions of the top and bottom layers respectively being folded onto respective first and second main body portions of the top and bottom layers, to form respective first top layer and second bottom layer hems, with respective first top layer and second bottom layer draw tapes being incorporated into the hems, the first and second edge portions being sealed to the respective main body portions to form first top layer and second bottom layer sealed hems, with the first top layer and second bottom layer draw tapes in the respective sealed hems, said machine comprising:

(a) hole forming apparatus for folding the first and second edge portions nested together back onto one of the top and bottom main body portions and forming holes therein, at spaced locations adjacent respective first and second free edges of the web, then unfolding the first and second edge portions;

(b) tape unwind apparatus following the hole forming apparatus for feeding draw tape material into proximity with, and aligned with, the first and second edge portions;

(c) hem forming apparatus following the tape unwind apparatus for receiving the draw tape material as first and second draw tapes, and for receiving the unfolded edge portions of the web, with holes therein, re-folding the first top and second bottom edge portions, toward each other and onto first and second ones of the main body portions of the respective layers, and incorporating the draw tapes into the hems, thus forming the first and second hems and incorporating the draw tapes inside; and (d) hem sealing apparatus downstream from the hem forming apparatus for sealing the first and second edge portions to the respective first and second main body portions, thus sealing the hems and securing the respective draw tapes therein.

18. The machine as in claim 17, said hole forming apparatus receiving the web with the top layer in overlying contact with the bottom layer, and folding the first and second edge portions with the first edge portion of the top layer nested inside the second edge portion of the bottom layer.

19. The machine as in claim 17, said hem forming apparatus forming the first and second hems about the first and second draw tapes.

20. The machine as in claim 17, said hem forming apparatus including first and second hem folding plows having first and second hem folding edges extending at first and second transverse angles to the direction of travel of the web and folding the first and second edge portions of the web, and first and second hem forming plows having first and second hem forming edges extending at third and fourth transverse angles to the direction of travel of the web and receiving the first and second folded edge portions from said hem folding edges, and folding the folded edge portions back onto the respective first and second main body portions, thus forming the first and second hems.

21. The machine as in claim 20, each said hem folding plow having an aperture therein, the respective draw tape advancing through the respective aperture in said hem folding plow for forming of the re spective hem about the tape.

22. The machine as in claim 21, the respective draw tapes advancing between each said hem folding plow and the respective layers.

23. The machine as in claim 20, said first and second hem folding edges comprising trailing edges of said hem folding plows, said first and second hem forming edges comprising leading edges of said hem forming plows.

24. The machine as in claim 20 wherein each said draw tape advances over the respective said hem folding plow in contact with the respective layer of web material in parallel with the folding of the edge portion of the respective layer by the respective said hem folding plow.

25. The machine as in claim 17, said top and bottom layers comprising first and second edge regions respectively, said hem forming apparatus including a separating plow separating the second edge region of the bottom layer from the corresponding first edge region of the top layer.

26. The machine as in claim 17, including at least one turning member downstream of said hem forming apparatus, assisting in returning the edge regions into face-to-face relationship with each other.

27. A machine for providing a draw tape in a plastic web, the plastic web having top and bottom layers, the top layer having a first main body portion, a first top layer edge portion, and first top layer free edge, the bottom layer having a second main body portion, second bottom layer edge portion, and second bottom layer free edge; the first and second edge portions of the top and bottom layers respectively being folded onto respective first and second main body portions of the top and bottom layers, to form respective first top layer and second bottom layer hems, with respective first top layer and second bottom layer draw tapes being incorporated into the hems, the first and second edge portions being sealed to the respective main body portions to form first top layer and second bottom layer sealed hems, with the first and second draw tapes in the respective sealed hems, said machine comprising:
 (a) hole forming apparatus for forming holes, at spaced locations in the first and second edge portions adjacent respective first and second free edges of the web;
 (b) tape unwind apparatus adjacent the hole forming apparatus for feeding draw tape material into proximity with the first and second edge portions; and
 (c) hem forming and sealing apparatus following the tape unwind apparatus for receiving the draw tape material as first and second draw tapes, and for forming the first and second hems, incorporating the draw tapes into the hems, and sealing the first and second edge portions to the respective first and second main body portions of the respective layers using respective first and second hem sealing elements, thus sealing the hems and securing the respective draw tapes therein, said hem forming and sealing apparatus including first and second stretching rollers applying transverse stretching forces to the respective layers at the first and second hems, with the draw tapes therein, upstream of the respective first and second hem sealing elements, while holding the main body portions of the top and bottom layers in surface-to-surface contact with each other.

28. The machine as in claim 27, said hem forming and sealing apparatus being disposed downstream in the processing sequence from said hole forming apparatus.

29. The machine as in claim 27, said hem forming apparatus forming the first and second hems about the first and second draw tapes.

30. The machine as in claim 27, said hem forming and sealing apparatus including first and second hem folding plows having first and second hem folding edges extending at first and second transverse angles to the direction of travel of the web and folding the first and second edge portions of the web, and first and second hem forming plows having first and second hem forming edges extending at third and fourth transverse angles to the direction of travel of the web and receiving the first and second folded edge portions from said hem folding edges, and folding the folded edge portions back onto the respective first and second main body portions, thus forming the first and second hems.

31. The machine as in claim 30, each said hem folding plow having an aperture therein, the respective draw tape advancing through the respective aperture in said hem folding plow for forming of the respective hem about the tape.

32. The machine as in claim 27, and wherein each said draw tape advances over the respective said hem folding plow in contact with the respective layer of web material in parallel with the folding of the edge portion of the respective layer by the respective said hem folding plow.

33. The machine as in claim 27, said hem forming and sealing apparatus including a separating plow separating the second edge region of the bottom layer from the corresponding first edge region of the top layer.

34. A machine for providing a draw tape in a plastic web, the plastic web having top and bottom layers, the top layer having a first main body portion, a first top layer edge portion, and first top layer free edge, the second bottom layer having a second main body portion, second bottom layer edge portion, and second bottom layer free edge; the first and second edge portions of the top and bottom layers respectively being folded onto respective first and second main body portions of the top and bottom layers, to form respective first top layer and second bottom layer hems, with respective first top layer and second bottom layer draw tapes being incorporated into the hems, the first and second edge portions being sealed to the respective main body portions to form first top layer and second bottom layer sealed hems, with the first and second draw tapes in the respective sealed hems, said machine comprising:
 (a) hole forming apparatus for forming holes, at spaced locations in the edge portions adjacent respective first and second free edges of the web;
 (b) tape unwind apparatus downstream from the hole forming apparatus for feeding draw tape material into proximity with the first and second edge portions;
 (c) hem forming and sealing apparatus, adjacent the hole forming apparatus for separating one of first and second edge regions of the top and bottom layers from the other of the first and second edge regions, turning the plane of the second edge region through a dihedral angle of at least 30 degrees with respect to the plane of the first edge region while holding the main body portions of the top and bottom layers in surface-to-surface contact with each other, receiving the draw tape material as first and second draw tapes at the respective edge regions, forming the first and second hems and incorporating the draw tape material into the hems, said hem sealing apparatus sealing the first and second edge portions to the respective first and second main body portions of the respective layers, thus sealing the hems and securing the draw tapes in the respective sealed hems while the first and second edge regions are separated; and
 (d) a turning member comprising an upstanding turning cone disposed downstream of said hem forming and sealing apparatus, for assisting in returning the separated one of the edge regions into face-to-face relationship with the other of the edge regions.

35. The machine as in claim 34, separating the first and second edge regions at an angle of from 30 degrees to about 160 degrees.

36. The machine as in claim 34, including a second turning member downstream of said turning cone, the returning of the separated one of the edge regions into face-to-face relationship with the other of the edge regions being effected first by said turning cone.

37. The machine as in claim 34, said hem forming and sealing apparatus maintaining the other of the first and second edge regions as a generally straight line extension of the main body portion of the respective layer.

38. A machine for providing a draw tape in a plastic web, the plastic web having top and bottom layers, the top layer having a first main body portion, a first top layer edge portion, and first top layer free edge, the bottom layer having a second main body portion, second bottom layer edge portion, and second bottom layer free edge; the first and second edge portions of the top and bottom layers respectively being folded onto respective first and second main body portions of the top and bottom layers, to form respective first top layer and second bottom layer hems, with respective first top layer and second bottom layer draw tapes being incorporated into the hems, the first and second edge portions being sealed to the respective main body portions to form first top layer and second bottom layer sealed hems, with the first and second draw tapes in the respective sealed hems, said machine comprising:

(a) hole forming apparatus forming holes, at spaced locations in the edge portions adjacent respective first and second free edges of the web;

(b) a plow downstream from the hole forming apparatus for separating the first and second edge portions and turning the plane of the bottom edge portion through a dihedral angle with respect to the plane of the top edge portion, (c) tape unwind apparatus following the separating plow for feeding first and second draw tapes into proximity with the first and second separated edge portions; and (d) hem forming and sealing apparatus following the tape unwind apparatus for receiving the draw tapes, forming the first and second hems, incorporating the draw tapes in the hems, and sealing the first and second separated edge portions to the respective first and second main body portions of the respective layers using respective first and second hem sealing elements, thus sealing the first and second hems and securing the respective draw tapes therein, said hem forming and sealing apparatus including an electrostatic pinning device pinning a formed hem, with draw tape therein, to an underlying support, and thereby controlling transverse positioning of the formed hem with respect to said machine as the hem traverses from the hem forming to the hem sealing apparatus.

39. The machine as in claim 38, said top and bottom layers comprising first and second edge regions respectively, said hem forming and sealing apparatus including a separating plow separating the second edge region of the bottom layer from the corresponding first edge region of the top layer.

40. A machine for providing a draw tape in a plastic web, the plastic web having top and bottom layers, the top layer having a first main body portion, and a first top layer edge portion, the bottom layer having a second main body portion, and second bottom layer edge portion; the first top layer and second bottom layer edge portions of the top and bottom layers respectively being folded onto respective first and second main body portions of the top and bottom layers, to form respective first and second hems, with respective first top layer and second bottom layer draw tapes being incorporated into the hems, the first and second edge portions being sealed to the respective main body portions to form first and second sealed hems, with the first top layer and second bottom layer draw tapes in the respective sealed hems, said machine comprising:

(a) tape unwind apparatus for feeding draw tape material into proximity with the first and second edge portions;

(b) hem forming apparatus following the tape unwind apparatus for receiving the draw tape material as first top and second bottom draw tapes, and for forming the first top layer and second bottom layer hems and incorporating the draw tape material into the hems;

(c) hem sealing apparatus for sealing the first top layer and second bottom layer edge portions to the respective first and second main body portions of the respective layers, thus sealing the hems and securing the respective draw tapes therein; and (d) hole forming apparatus disposed up-stream in said machine from said hem forming apparatus, said hole forming apparatus comprising:

(i) in-turn and back-fold plows for receiving the first top and second bottom edge portions of the web in a flat disposition and folding the first top layer and second bottom layer edge portions nested together back onto one of the first and second main body portions of the web, and (ii) a cutter for forming holes, at spaced locations in the nested top and bottom layer edge portions adjacent respective first top and second bottom free edges of the web before said hem forming apparatus forms the first and second hems.

41. The machine as in claim 40, said hem forming apparatus forming the first and second hems about the first and second draw tapes.

42. The machine as in claim 40, said hem forming apparatus including first and second hem folding plows having first and second hem folding edges extending at first and second transverse angles to the direction of travel of the web and folding the first and second edge portions of the web, and first and second hem forming plows having first and second hem forming edges extending at third and fourth transverse angles to the direction of travel of the web and receiving the first and second folded edge portions from said hem folding edges, and folding the folded edge portions back onto the respective first and second main body portions, thus forming the first and second hems.

43. The machine as in claim 42, each said hem folding plow having an aperture therein, the respective draw tape advancing through the respective aperture in said hem folding plow for forming of the respective hem about the tape.

44. The machine as in claim 43, the respective draw tapes advancing between each said hem folding plow and the respective layers.

45. The machine as in claim 42, said first and second hem folding edges comprising trailing edges of said hem folding plows, said first and second hem forming edges comprising leading edges of said hem forming plows.

46. The machine as in claim 42, and wherein each said draw tape advances over the respective said hem folding plow in contact with the respective layer of web material in parallel with the folding of the edge portion of the respective layer by the respective said hem folding plow.

47. A machine for providing a draw tape in a plastic web, the plastic web having top and bottom layers, the top layer having a first main body portion, and a first top layer edge portion, the bottom layer having a second main body portion, and second bottom layer edge portion; the first and second edge portions of the top and bottom layers respectively being folded onto respective first and second main body portions of the top and bottom layers, to form respective first top layer and second bottom layer hems, with respective first top layer and second bottom layer draw tapes being incorporated into the hems, the first and second edge portions being sealed to the respective main body portions to form first and second sealed hems, with the first and second draw tapes in the respective sealed hems, said machine comprising:

(a) hole forming apparatus, comprising:
  (i) plows for receiving the first and second edge portions of the web in a flat disposition and folding the first and second edge portions nested together back onto one of the first and second main body portions of the web,
  (ii) a cutter for forming holes, at spaced locations in the nested top and bottom layer edge portions adjacent respective first and second free edges of the web; and
  (iii) a plow for returning said nested first and second edge portions to the flat disposition;
(b) tape unwind apparatus downstream from the hole forming apparatus for feeding first and second draw tapes into proximity with, and aligned with, the first and second edge portions;
(c) hem forming apparatus adjacent the tape unwind apparatus for receiving the first and second draw tapes and folding the first and second edge portions about respective ones of the first and second draw tapes and onto respective first and second main body portions of the respective layers, thus forming the first and second hems about the draw tapes, with the draw tapes inside; and
(d) hem sealing apparatus following the hem forming apparatus for sealing the first and second edge portions to the respective first and second main body portions, thus sealing the hems and securing the respective draw tapes therein.

48. The machine as in claim 47, said hem forming apparatus including first and second hem folding plows having first and second hem folding edges extending at first and second transverse angles to the direction of travel of the web and folding the first and second edge portions of the web, and first and second hem forming plows having first and second hem forming edges extending at third and fourth transverse angles to the direction of travel of the web and receiving the first and second folded edge portions from said hem folding edges, and folding the folded edge portions back onto the respective first and second main body portions, thus forming the first and second hems.

49. The machine as in claim 48, each said hem folding plow having an aperture therein, the respective draw tape advancing through the respective aperture in said hem folding plow for forming of the respective hem about the tape.

50. The machine as in claim 49, the respective draw tapes advancing between each said hem folding plow and the respective layers.

51. The machine as in claim 48, said first and second hem folding edges comprising trailing edges of said hem folding plows, said first and second hem forming edges comprising leading edges of said hem forming plows.

52. The machine as in claim 48, each said draw tape advances over the respective said hem folding plow in contact with the respective layer of web material in parallel with the folding of the edge portion of the respective layer by the respective said hem folding plow.

53. The machine as in claim 47, said top and bottom layers comprising first and second edge regions respectively, said hem forming apparatus including a separating plow separating the second edge region of the bottom layer from the corresponding first edge region of the top layer.

54. The machine as in claim 47, said hem forming apparatus being disposed downstream in the processing sequence from said hole forming apparatus.

55. A machine for providing a draw tape in a plastic web, the plastic web having top and bottom layers, the top layer having a first top layer main body portion, a first top layer edge portion and a first top layer free edge, the bottom layer having a second bottom layer main body portion, a second bottom layer edge portion, and second bottom layer free edge; the first top and second bottom edge portions respectively of the top and bottom layers respectively being folded onto respective first top and second bottom main body portions of the top and bottom layers, to form respective first top layer and second bottom layer hems, with respective first top layer and second bottom layer draw tapes being incorporated into the hems, the first and second edge portions being sealed to the respective main body portions to form first top layer and second bottom layer sealed hems, with the first and second draw tapes in the respective sealed hems, the machine comprising:
  (a) hole forming apparatus for forming holes at spaced locations in the web, in the edge portions adjacent respective first top and second bottom free edges of the web, said hole forming apparatus including:
    (i) an in-turn plow for receiving the first and second edge portions of the web in a flat disposition and turning the first and second edge portions nested inwardly toward the main body portions of the web,
    (ii) a back-fold plow following the in-turn plow for receiving the in-turned edge portions of the web and folding the nested edge portions back onto one of the first and second main body portions of the web, the back-fold plow having a notch,
    (iii) a hole cutter located adjacent the notch in said back-fold plow for cutting holes in the web as the web traverses the notch, and
    (iv) an out-turning plow following the hole cutter for receiving the first and second edge portions from the back-fold plow and restoring the first and second edge portions to a flat condition;
  (b) tape unwind apparatus adjacent the hole forming apparatus for feeding draw tape material into proximity with the first and second edges;
  (c) hem forming apparatus disposed downstream in the processing sequence from the hole forming apparatus for receiving the draw tape material as first and second draw tapes, and forming the first and second hems; and
  (d) hem sealing apparatus adjacent the hem forming apparatus for sealing the first and second edge portions to the respective web layers, thus sealing the hems and securing the respective draw tapes therein.

56. The machine as in claim 55, said in-turn plow receiving the web with the top layer in overlying contact with the bottom layer, and folding the first and second edge portions with the first edge portion of the top layer nested inside the second edge portion of the bottom layer.

57. The machine as in claim 55, said hem forming apparatus forming the first and second hems about the first and second draw tapes.

58. The machine as in claim 55, said hem forming apparatus including first and second hem folding plows having first and second hem folding edges extending at first and second transverse angles to the direction of travel of the web and folding the first and second edge portions of the web, and first and second hem forming plows having first and second hem forming edges extending at third and fourth transverse angles to the direction of travel of the web and receiving the first and second folded edge portions from said hem folding edges, and folding the folded edge portions back onto the respective first and second main body portions, thus forming the first and second hems.

59. The machine as in claim 58, each said hem folding plow having an aperture therein, the respective draw tape advancing through the respective aperture in said hem folding plow for forming of the respective hem about the tape.

60. The machine as in claim 59, the respective draw tapes advancing between each said hem folding plow and the respective layers.

61. The machine as in claim 58, said first and second hem folding edges comprising trailing edges of said hem folding plows, said first and second hem forming edges comprising leading edges of said hem forming plows.

62. The machine as in claim 61 wherein said hem folding plows and said hem forming plows each have web contact surfaces for contacting respective edge regions of the respective top and bottom layers of said web, said web contact surfaces on said first hem forming plow and said first hem folding plow being disposed at an obtuse dihedral angle with respect to each other, and said web contact surfaces on said second hem forming plow and said second hem folding plow being disposed at an obtuse dihedral angle with respect to each other.

63. The machine as in claim 58 wherein each said draw tape advances over the respective said hem folding plow in contact with the respective layer of web material in parallel with the folding of the edge portion of the respective layer by the respective said hem folding plow.

64. The machine as in claim 55, said in-turn plow having an outer edge disposed at an angle with respect to a free edge of the web, extending inwardly across the web along the direction of travel of the web, and aligned with a first inner edge of said back-fold plow, said first inner edge of said back-fold plow being disposed at an angle with respect to an edge of the web approximately equal to the angle formed by the outer edge of the in-turn plow with respect to an edge of the web, said back-fold plow having a second inner edge, intersecting said first inner edge and being disposed at an angle with respect to a free edge of the web, approximately equal to the angle formed by the outer edge of the in-turn plow with respect to a free edge of the web, but advancing outwardly across the web along the direction of advance of the web, said out-turning plow having an outer edge aligned with said second inner edge of said back-fold plow, respective loci on said outer edges on said in-turn plow and said out-turning plow being aligned with each other along a transverse dimension of the web.

65. The machine as in claim 64, said back-fold plow having an outer edge extending in the direction of travel of said web, having a notch in said outer edge, and a hole cutter adjacent the notch in said outer edge of the back-fold plow for cutting spaced holes in the folded edge portions of the top and bottom layers of the web as the folded edge portions traverse the notch.

66. The machine as in claim 55, said in-turn plow, said back-fold plow, and said out-turning plow having respective first, second, and third web guiding surfaces guiding the web adjacent said edge portions, said first and third web guiding surfaces being disposed at obtuse angles with respect to said second web guiding surface.

67. The machine as in claim 66, said first and third web guiding surfaces defining substantially equal and opposite angles from said second web guiding surface.

68. The machine as in claim 55, said top and bottom layers comprising first and second edge regions respectively, said hem forming apparatus including a separating plow separating the second edge region of the bottom layer from the corresponding first edge region of the top layer.

69. The machine as in claim 55, including at least one turning member downstream of said hem forming apparatus, assisting in returning the edge regions into face-to-face relationship with each other.

70. The machine as in claim 69, said at least one turning member comprising an upstanding turning cone.

71. The machine as in claim 70, including a second turning member downstream of said turning cone, returning the separated one of the edge regions into face-to-face relationship with the other of the edge regions being effected by said turning cone.

* * * * *

UNITED STATES PATENT AND TRADEMARK OFFICE
CERTIFICATE OF CORRECTION

PATENT NO. : 5,857,953
DATED : January 12, 1999
INVENTOR(S) : Paul A. Selle et al.

It is certified that error appears in the above-identified patent and that said Letters Patent is hereby corrected as shown below:

Column 2,
Line 56, delete the second occurrence of "draw tape".

Column 8,
Line 36, before "Thus, the dihedral" insert --It is contemplated that the edge region 36 could readily adopt orientations other than vertical.--.

Claim 16,
Line 3, after "layers, and" insert --means for providing--.

Claim 21,
Line 4, change "re spective" to --respective--.

Claim 29,
Line 1, after "hem forming" insert --and sealing--.

Signed and Sealed this

Fourteenth Day of August, 2001

*Attest:*

NICHOLAS P. GODICI
*Attesting Officer*   Acting Director of the United States Patent and Trademark Office